United States Patent [19]
Somani et al.

[11] Patent Number: 5,524,212
[45] Date of Patent: Jun. 4, 1996

[54] MULTIPROCESSOR SYSTEM WITH WRITE GENERATE METHOD FOR UPDATING CACHE

[75] Inventors: Arun K. Somani, Woodinville; Craig M. Wittenbrink, Seattle; Chung-Ho Chen, Seattle; Robert E. Johnson, Seattle; Kenneth H. Cooper, Marysville; Robert M. Haralick, Seattle, all of Wash.

[73] Assignee: University of Washington, Seattle, Wash.

[21] Appl. No.: 876,775

[22] Filed: Apr. 27, 1992

[51] Int. Cl.$^6$ .......................... G06F 15/167; G06F 15/17
[52] U.S. Cl. .................. 395/200.08; 395/448; 395/468; 395/471; 395/800; 364/228.7; 364/241.9; 364/243.41; 364/243.5; 364/940.67; 364/964.31; 364/964.27; 364/DIG. 1; 364/DIG. 2
[58] Field of Search ..................................... 395/425, 800, 395/468, 471, 448, 200.08; 364/228.7, 228.9, 241.9, 243.41, 243.5, 940.67, 964.31, 964.27

[56] References Cited

U.S. PATENT DOCUMENTS

| | | | |
|---|---|---|---|
| 4,041,472 | 8/1977 | Shah et al. | 395/325 |
| 4,414,624 | 11/1983 | Summer, Jr. et al. | 395/650 |
| 4,791,641 | 12/1988 | Hillis | 371/37.6 |
| 4,805,091 | 2/1989 | Thiel et al. | 395/800 |
| 4,807,228 | 2/1989 | Dahbura et al. | 371/9.1 |
| 4,809,202 | 2/1989 | Wolfram | 364/578 |
| 4,827,403 | 5/1989 | Steele, Jr. et al. | 395/800 |
| 4,899,342 | 2/1990 | Potter et al. | 371/10.1 |
| 5,008,815 | 4/1991 | Hillis | 395/800 |
| 5,146,603 | 9/1992 | Frost et al. | 395/425 |
| 5,151,979 | 9/1992 | Poskitt | 395/325 |
| 5,163,142 | 11/1992 | Mageau | 395/425 |
| 5,197,139 | 3/1993 | Emma et al. | 395/400 |
| 5,369,753 | 11/1994 | Tipley | 395/425 |

OTHER PUBLICATIONS

Chen et al, "An Effective Write Policy for Software Coherence Schemes", Univ. of Illinois, IEEE, 1992, pp. 661–672.

Thorson, "Multiprocessor Cache Coherency: MOESI Model Describes Snooping Protocols," Microprocessor Report, v4, N11, Jun. 1990, p. 124.

C. Wittenbrink, "Directed Data Cache for High Performance Morphological Image Processing", Thesis submitted Oct. 8, 1990.

Choi, Somani, "The Generalized Folding Cube"; NETWORK Mar. 1991.

Choi, Somani, "The Generalized Folding Cube", 1990 Internat'l Conference on Parallel Processing.

Pfister et. al., "The IBM Research Parallel Processor Prototype (RP3) : Intro. . . . " 0190– 3918/85/0000/0764, IEEE 1985.

G. Radin, "The 801 Minicomputer", 00–89791–066–4, ACM 1982.

(List continued on next page.)

Primary Examiner—Thomas G. Black
Assistant Examiner—Jack M. Choules
Attorney, Agent, or Firm—Steven P. Koda

[57] ABSTRACT

A plurality of program processors, shared memory, dual port memory, external cache memory and a control processor form a multiprocessor system. A shared memory bus links the program processors, shared memory, dual port memory and external cache memory. Program processor I/O occurs through a pair of serial I/O channels coupled to one port of the dual port memory. A write generate mode is implemented for updating cache by first allocating lines of shared memory as write before read areas. For such lines, cache tags are updated directly on cache misses without reading from memory. A hit is forced for such line, resulting in valid data at the updated part and invalid data at the remaining portion. Thus, part of the line is written to and the rest invalidated. The invalid portions are not read, unless preceded by a write operation. The mode reduces the number of bus cycles by making write misses more efficient.

6 Claims, 17 Drawing Sheets

OTHER PUBLICATIONS

Brandley et. al., "RP3 Processor–Memory Element", 0190-3918/85/0000/0782, IEEE 1985.

MC68030 User's Manual, Motorola, (No Date).

A. Smith, "Cache Memories", Computing Surveys vol. 14, No. 3 Sep., 1982.

Opferman et. al., "On a Class of Rearrangeable Switching . . ." Bell System Technical Journal vol. 50, No. 5, May–Jun. 1971.

Sky Computers, Inc. "SKYbolt Shamrock Family Product Summary" (No Date).

The 17th Annual International Symposium on Computer Architecture; May 28–31, 1990 Seattle, Washington.

Dally et. al.; "The Message–Driven Processor: A Multicomputer Processing Node with . . . " IEEE 0272–1732; Apr. 1992.

Gross; "Communication in iWarp Systems;" ACM 089791-341-8; 1989.

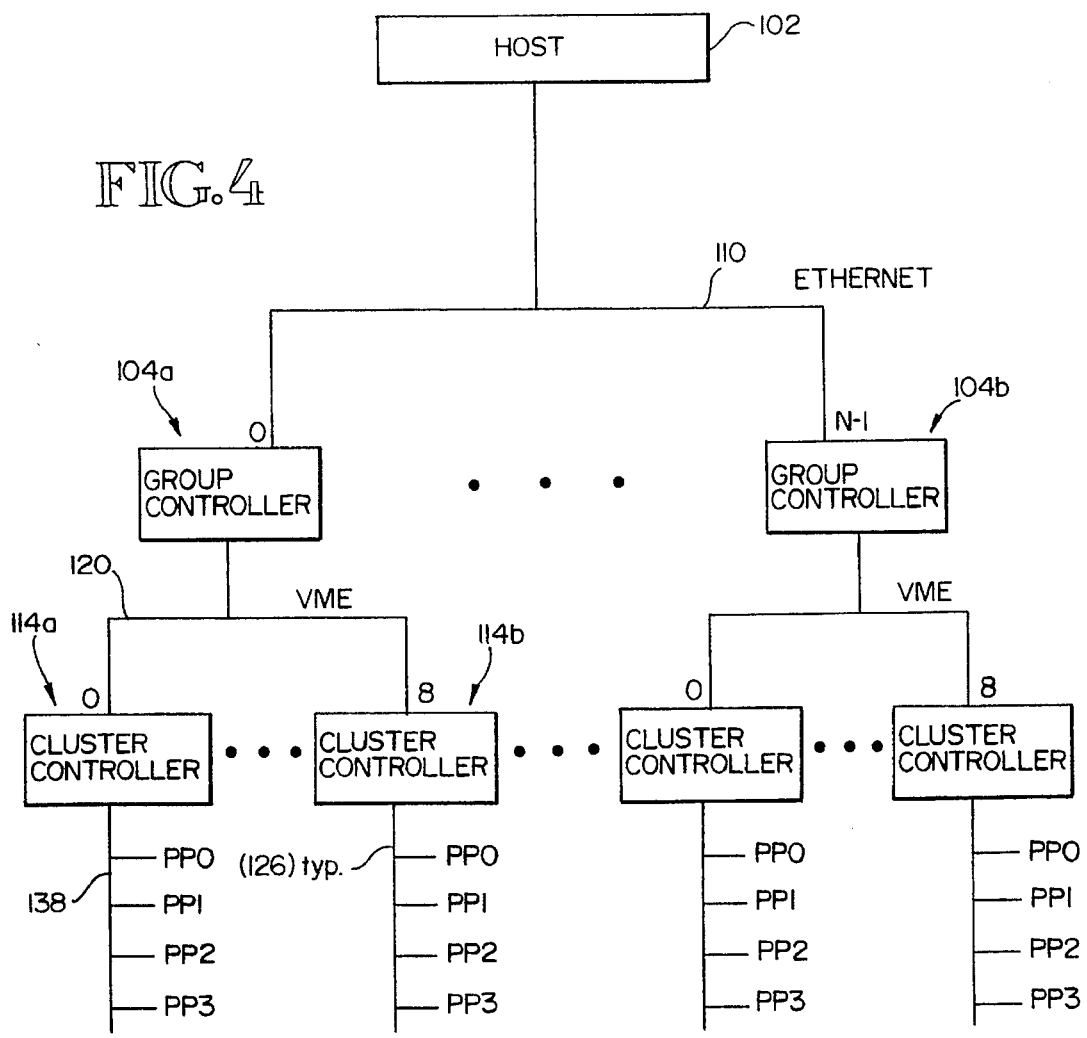
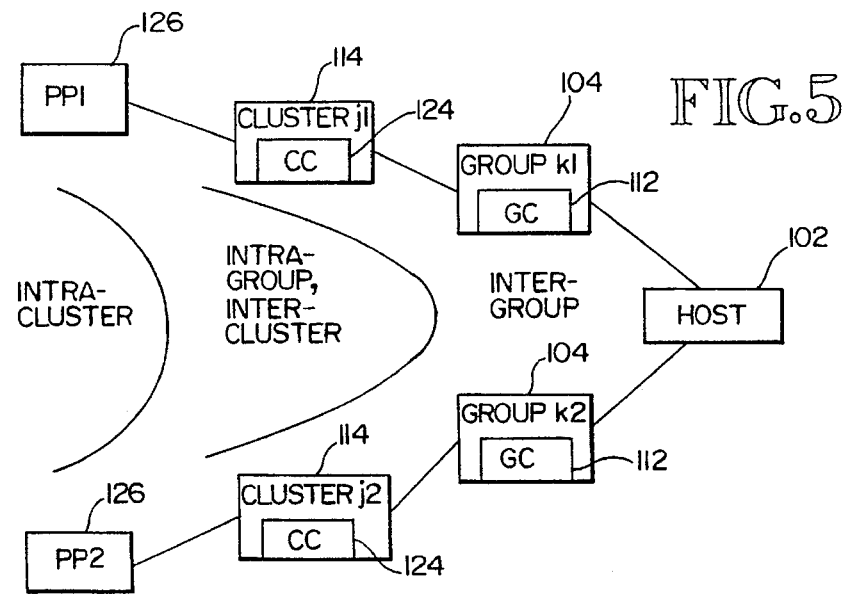

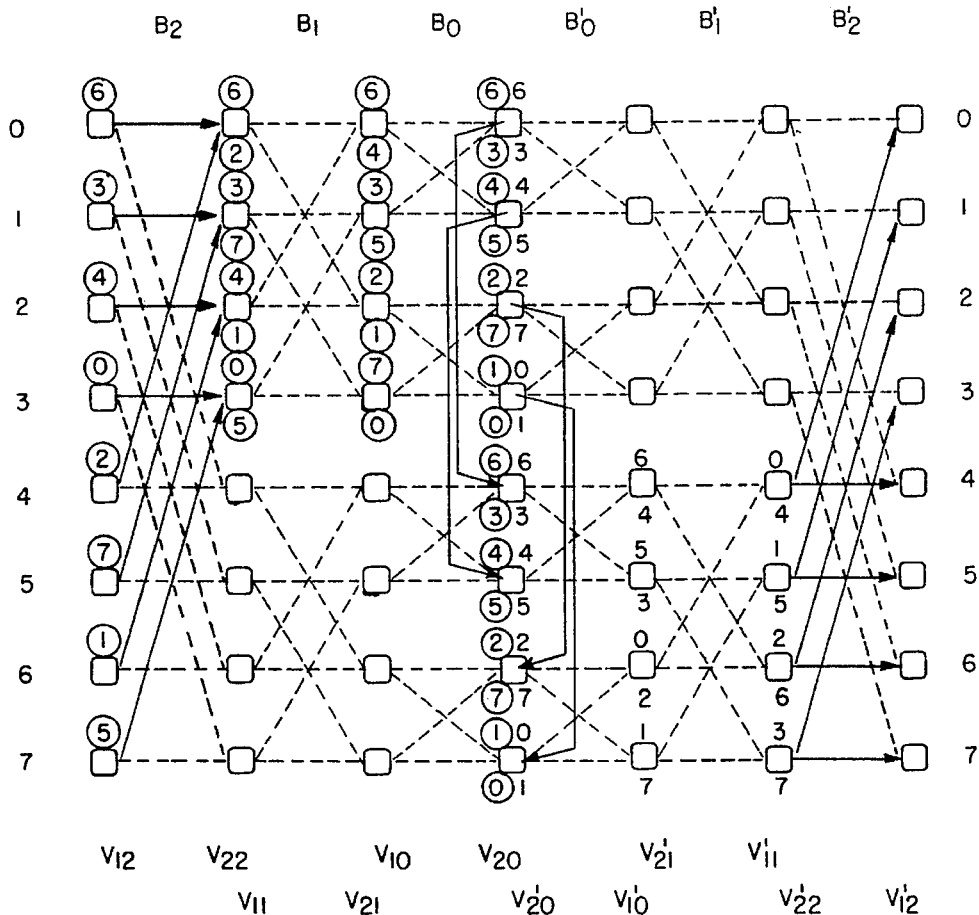

FIG. 11

$\pi(0) = 6$    $(0) \to 0 \to 0 \to 0 \to 4 \to 4 \to 6 \to (6)$
$\Longrightarrow (0) \to 4 \to (6)$ $\pi(1) = 3$    $(1) \to 1 \to 1 \to 0 \to 4 \to 5 \to 7 \to (3)$
$\Longrightarrow (1) \to 0 \to 4 \to 5 \to 7 \to (3)$ $\pi(2) = 4$    $(2) \to 2 \to 0 \to 1 \to 5 \to 4 \to 4 \to (4)$
$\Longrightarrow (2) \to 0 \to 1 \to 5 \to 4$ $\pi(3) = 0$    $(3) \to 3 \to 3 \to 3 \to 7 \to 6 \to 4 \to (0)$
$\Longrightarrow (3) \to 7 \to 6 \to 4 \to (0)$ $\pi(4) = 2$    $(4) \to 0 \to 2 \to 2 \to 6 \to 6 \to 6 \to (2)$
$\Longrightarrow (4) \to 0 \to (2)$ $\pi(5) = 7$    $(5) \to 1 \to 3 \to 2 \to 6 \to 7 \to 7 \to (7)$
$\Longrightarrow (5) \to 1 \to 3 \to 2 \to 6 \to (7)$ $\pi(6) = 1$    $(6) \to 2 \to 2 \to 3 \to 7 \to 7 \to 5 \to (1)$
$\Longrightarrow (6) \to 2 \to 3 \to 7 \to 5 \to (1)$ $\pi(7) = 5$    $(7) \to 3 \to 1 \to 1 \to 5 \to 5 \to 5 \to (5)$
$\Longrightarrow (7) \to 3 \to 1 \to (5)$

FIG. 12

MULTIPROCESSOR SYSTEM WITH WRITE GENERATE METHOD FOR UPDATING CACHE

FEDERAL FUNDING STATEMENT

This invention was made with government support under grant number N00039-88-C-0054 awarded by the Department of the Navy. The government has certain rights in the invention.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the public Patent and Trademark Office file or records, but otherwise reserves all copyright rights whatsoever.

BACKGROUND OF THE INVENTION

This invention relates to MIMD ("multiple instruction multiple data") parallel processing systems. More particularly this invention relates to (1) an enhanced hypercube multiprocessor system architecture, and (2) a SPMD ("single program multiple data"), distributed-memory, image multiprocessor system. The image multiprocessor system has (i) a circuit-switched, reconfigurable connection network, and (ii) fault tolerant network synchronization.

The background is organized as follows:

A. Multiprocessor System Architectures
B. Multiprocessor System Connection Techniques
   1. Packet Switching
   2. Circuit Switching
C. Multiprocessor System Fault Tolerant Synchronization
D. Multiprocessor System Cache
E. Multiprocessor System Applications—Image Processing A. Multiprocessor System Architectures Multiprocessor systems capable of performing parallel processing are desirable for improving the speed of executing complex tasks. Different architectures are suited for different types of processing. For example, the mesh architecture is suitable for breaking up complex mathematical algorithms into small sub-algorithms. Other architectures implement a pipeline in which each processor is one element in a pipeline. Each processor executes its sub-task over and over passing its result onto the next processor in the pipeline. The algorithm result is achieved from the output of the last processor or a combination of outputs from multiple processors.

The n-cube or hypercube architecture has high potential for parallel execution of processing tasks. FIG. 1 shows hypercube architectures for dimensions n=0 through n=3. A hypercube is characterized as having $N=2^n$ "nodes", where n is the number of dimensions to the cube. FIG. 1a shows a hypercube 10 having dimension n=0, and thus, $N=2^0=1$ node 12. FIG. 1b shows a hypercube 14 having dimension n=1, and thus, $N=2^1=2$ nodes 16, 18. The nodes 16, 18 are connected by a communication "link" 20. FIG. 1c shows a hypercube 22 having dimension n=2, and thus, $N=2^2=4$ nodes 24, 26, 28, 30. In general, an n-cube is formed by connecting 2 cubes of dimension n−1. Thus, the 2-cube 22 of FIG. 1c is equal to two 1-cubes 14', 14" connected together. The two 1-cubes 14', 14" are connected by placing a link between corresponding nodes of each cube 14', 14". Thus, a link 32 couples node 24 (16') with node 26 (16"). A link 34 couples node 28 (18') with node 30 (18").

FIG. 1d shows a hypercube 36 having dimension n=3, and thus $2^3=8$ nodes. The 3-cube 36 is formed by two 2-cubes 22', 22" with links 38, 40, 42, 44 connecting respective nodes of the two 2-cubes.

The hypercube is well suited for parallel processing tasks due to its regularity, symmetry and strong connectivity. It is regular in that the topology is the same for each node. As shown in FIG. 1c each node has the same number of links. It is symmetrical as apparent from visual inspection, making it suitable for highly concurrent multiprocessing where many processors work simultaneously on one problem. It has strong connectivity in that a direct communication route can be established among nodes.

One of the inventive subject matters described in this application relates to an "enhanced" hypercube architecture. Examples of prior hypercube multiprocessing systems include: (1) *The Connection Machine* by W. D. Hillis, Cambridge Mass.; MIT Press 1985 and corresponding U.S. Pat. No. 5,008,815; (2) Caltech's *The Cosmic Cube* by C. L. Seitz, Commun. ACM, vol. 28, pp. 22–33, January 1985; (3) Floating Point Systems T series system, *Journal of Parallel Distributed Computing*, vol. 3, pp. 297–304, September 1986. Several other hypercube multiprocessor systems also are known including the NCUBE, the Ametek, Intel's iPSC, and Thinking Machine Corporation's CM series of computers.

FIG. 2 shows a generalized folding cube (hypercube) conceived by the above named-inventors A. K. Somani and S. B. Choi and first described at the August 1990 International Conference on Parallel Processing. A 3-dimensional generalized folding cube ("GFC") 50 is shown. Each node 52i of the GFC has $2^p$ processing elements 54 coupled to the hypercube 50 through a switch module 56i. In addition, instead of one link between each node 52, there are $2^p$ links. FIG. 2 depicts a 3-cube GFC with p=1. Thus, there are $N=2^{n=3}=8$ nodes, $2^{p=1}=2$ processing elements per node, and $2^{p=1}=2$ links between nodes. The enhanced hypercube of this invention is an improvement over the GFC offering an efficient network for embedding routing permutations.

B. Multiprocessor System Connection Techniques

The two primary routing techniques employed by multiprocessor connection networks for communication between nodes are packet switching and circuit switching. An inventive subject matter of this application relates to a reconfigurable circuit switching connection network.

Another inventive subject matter relates to a process for determining communication routes (i.e., permutations) in the enhanced hypercube. A routing process implements communication requests between nodes in a multiprocessor system network establishing an appropriate path from every given source node to a respective destination node. The objective of a routing process is to maximize network throughput with minimum cost in terms of path length. Congestion on a communication link is undesirable. To maximize throughput, a routing process provides as many communication paths as possible. To minimize cost, the shortest paths are preferred. A discussion of the two primary routing techniques follows.

1. Packet Switching

In networks implementing packet switching, "packets" of data are queued at intermediate nodes along a route between a source node and a destination node. The packet travels from node to node, releasing links and switching elements immediately after using them. Such "store and forward" operations cause a time delay which can result in significant performance degradation, particularly in the execution of an I/O bound operation. Packet switching typically is a recursive routing process in which each node redirects a message to a next node on a link determined by the exclusive OR (relative address) of a current node address and a destination node address. The routing is very regular and used in a centralized or decentralized fashion. This is a shortest-path type process. However, such routing is unsatisfactory because of high blocking probability and the expense of queues and/or buffers assigned to each outgoing link. The high blocking probability is due to the limited space of a queue, in practice, which eventually causes significant data loss or time delay. A packet switching variation for conventional hypercube architectures is referred to as wormhole routing.

Point to point and broadcast packet switching processes under fault-free and fault-tolerant conditions are described in (1) *Optimum broadcasting and personalized communication in hypercubes* by S. L. Johnson and C. T. Ho, IEEE Transactions on Comput., vol. 38, pp. 1249–1268, September 1989; (2) *Reliable Broadcast in Hypercube Multicomputers* by P. Ramanathan and K. G. Shin, IEEE Transactions on Comput., vol. C-37, pp. 1654–1657, December 1988; (3) *A Large Scale, Homogeneous, Fully Distributed Parallel Machine* by H. Sullivan and T. R. Bashkow, IEEE Proceedings 4th Annual Symposium on Computer Architecture, pp. 105–117, 1977; (4) *A Scheme for Fast Parallel Communication* by L. G. Valiant, SIAM Journal of Comput., vol. 11, pp. 350–361, May 1982.

2. Circuit Switching

In networks implementing circuit switching, a complete, dedicated path from a source to a destination is established through the network before communication begins. A path is formed by one or more communication links. Alternative paths are called routes. Thus, the path is chosen from the pool of routes. If a free route does not exist from end-to-end, communication traffic is blocked and must wait for later transmission. Previously, the free route requirement has been a significant barrier to the use of circuit switching networks.

The process of selecting paths is called routing. At any given time, the aggregate of selected paths implementing inter-node communication is called a connection network "state" or "configuration". The different states of a connection network are called permutations. Given a system of N nodes, a connection network has N! worst-case possible permutations to satisfy (i.e., where one-to-one connection requests occur, and each source node requests connection to a unique destination node). The joining of (i.e., communication between) two links is called a "connection". A network is said to be rearrangable if its permitted states can realize every possible permutation by rearranging existing connections. Rearrangability is acceptable as long as communications are not interrupted (i.e., there is always a free route).

Rearrangability for a hypercube having three or less dimensions is conceived by T. Szymanski in *On the Petmutation Capability of a Circuit-Switched Hypercube*, Proceeding 1989, International Conference on Parallel Processing, vol. I, pp. 103–110, August 1989. Szymanski presents a simulation in which the permutation capability of a circuit-switched hypercube is examined. His routing process implements an exhaustive search algorithm (i.e., global backtracking depth first search). If any connection in a permutation can not be realized after exhaustively searching through every possible routing option, all connections are erased and the searching continues. A problem with this routing process is that it is too slow for high performance parallel processing systems where routing overhead time is to be minimized. In particular, as larger systems are considered, more overhead time is required to complete the search. For hypercubes having n greater than or equal to 5, the blocking probability approaches one under such type of algorithm.

Rearrangability for a generalized folding cube is conceived by named inventors S. B. Choi and A. K. Somani. See *The Generalized Folding-Cube* by Sang Bang Choi and Arun K. Somani, 1990 International Conference on Parallel Processing.

C. Multiprocessor System Fault Tolerant Synchronization

Synchronizing a network of multiple processor nodes allows nodes to share resources efficiently, run synchronous programs and for fault tolerant systems, vote on redundant results. Previously algorithms for synchronizing binary hypercubes have been developed for conditions in which no faults are present. See *An optimal synchronizer for the hypercube* by D. Peleg and J. D. Ullman, Society for Industrial and Applied Mathematics, 18(4) PP. 740–747, 1989. According to such an algorithm, when a node finishes all of its tasks for a cycle the node sends a status indication to the other nodes. A node will only start the tasks of a new cycle when it has received enough messages to ensure that all of the tasks for that cycle have been finished by other nodes. Difficulty arises in the synchronization of a multiprocessor system having a system of nodes asynchronously finishing tasks when the system of nodes is to continue in the presence of faults. Specifically, fault tolerant synchronization in such multiprocessor systems has been a long time problem in the multiprocessor system field.

Conventional ways of synchronizing a network include establishing a global time base using clock synchronization techniques. Multistage synchronizers and phased locked loops are two prior hardware approaches to establishing such a time base. These approaches require fully connected networks. Such solutions keep the internal clocks of the system in step, even in the presence of faults. However, the cost overhead for large multiprocessor systems is high. Even though PLLs have been used in systems with less than fully connected networks, they do not work for systems with connection networks as sparse as the hypercube. See *Synchzronization and Matching in Redundant Systems*, by D. Davies and J. F. Wakerly, IEEE Transactions on Computers, vol. 27 no. 6, pp. 752–756, 1978; and *Ensuring Fault-tolerance of Phased-locked Clocks*, by C. M. Krishna, K. G. Shin and R. W. Butler, IEEE Transactions on Computers vol. 34 no. 8, pp. 752–756, 1985; and *Clock Synchronization of a Large Multiprocessor System in the Presence of Malicious Faults*, by K. G. Shin and P. Ramanathan, IEEE Transactions on Computers, vol. 36 no. 1, pp. 2–12, 1987.

Another prior way of synchronizing global clocks in the presence of faults is by executing interactive convergence or interactive consistency algorithms. While such approaches may work in a some hypercubes, the worst case skew between nodes is large and the communication overhead too expensive for many applications. Even with time stamping of messages to reduce skew, the overhead is still large. See *Synchronizing Clocks in the Presence of Faults*, L. Lamport and P. M. Melliar-Smith, Journal of the ACM, vol. 32 no. 1, pp. 57–58, 1985; and *Hardware-assisted Software Clock Synchronization for Homogeneous Distributed Systems*, IEEE Transactions on Computers, vol 39, no. 4, pp. 514–524, 1990.

Accordingly, a fault tolerant synchronization scheme for a multiprocessor system is needed which adds little or no processing overhead. One inventive subject matter of this application is a hardware embodied method of synchronizing sparsely connected multiprocessor systems such as hypercubes.

D. Multiprocessor System Cache

A problem with implementing caches in multiprocessor imaging systems is that excessive memory accesses limit the bandwidth of the memory bus, thereby degrading performance. A high cache hit ratio avoids the bus bottleneck. For morphological processing where the structuring element is large enough, small caches map input data to the same locations. Because data are stored in the same locations they replace each other. Repeated replacement, thrashing, is inefficient. Write through also is inefficient. Algorithms that do limited processing per pixel generate results quickly. If the results are not cached, but written through to main memory, then bus traffic is higher.

Previous cache write schemes include write back, write through, write around and write allocate. See *Computer Architecture, A Quantitative Approach* by J. L. Hennessy and D. A. Patterson San Mateo, Calif. Morgan Kaufman, 1990; *RP3 Processor-Memory Element* by W. C. Brantlet, K. P. McAuliffe and J. Weiss, IBM Watson Research Center, IEEE Publ. No. 0190-3918/85/0000/0782, 1985; *The IBM Research Parallel Processor Prototype (RP#) Introduction and Architecture,* by G. F. Pfister et. al., IBM Watson Research Center, IEEE Publ. No. 0190- 3918/85/0000/0764, 1985; *The* 801 *Minicomputer,* by G. Radin, IBM Watson Research Center, ACM Publ. No. 0-89791-066-4, 1982.

E. Multiprocessor System Applications—Image Processing

One scheme for categorizing data processing systems is among: (1) single instruction, single data machines (SISD) (i.e., conventional personal computer); (2) single instruction, multiple data machines (SIMD) (i.e., a MASPAR or connection machine one (CM1)); and (3) multiple instruction, multiple data (MIMD) machines. Most parallel processing systems are MIMD machines.

Effective multiprocessing performance depends on the ease of network synchronization, the efficiency in partitioning a problem, the amount of communication among multiple processors, and the computation and communication overlap. Fine granularity into application partitions results in the execution of smaller tasks which run in parallel. Such systems, however, often have a maximum overhead cost (i.e., added processing time delays) in terms of data sharing and system synchronization. Thus, a system which implements fine granularity does not necessarily achieve the fastest solution to a problem. At an increased granularity (i.e., low granularity), communication overhead such as message preparation, transmission, handling and receiving are still large for most applications. At the coarse granularity level multiprocessor systems implement large individual tasks which communicate less frequently. Efficiency is improved as the communication and synchronization overhead amortized over a computation cycle is much smaller per time unit than in fine-grained or low-grained systems.

One aspect of the multiprocessor system of this invention is its large granularity. The system is a single program, multiple data (SPMD) machine. Thus, the instruction granularity is at the program unit. Each processor executes a complete program, instead of dividing it into sub-program units in which each processor executes 3 or 4 instructions.

An example of a prior SPMD multiprocessor machine is the PASM (a research MIMD packet-switching machine which emulates SIMD machines). Previously, SPMD machines have all been packet switched machines. There have been no SPMD circuit-switched multiprocessor systems, and no SPMD circuit-switched image multiprocessor systems.

Accordingly, to effectively perform large image processing tasks, there is a need for a multiprocessor system having: (1) high speed processing elements; (2) coarsely-grained application partitions; (3) low message communication overhead; (4) effective partitioning in which computations absorb data movement latencies; and (5) effective network routing of large messages.

SUMMARY OF THE INVENTION

According to the invention, a secondary cache implements a write generate mode. To implement such feature effectively, portions of main memory are allocated as write before read areas. Cache write generate is implemented only for these areas. In particular, cache lines are set to allow cache write generate operations. For such lines, cache tags are updated directly on cache misses without reading from memory. A hit is forced for such line, resulting in valid data at the updated part and invalid data at the remaining portion. The "cache write generate" operation for write before read areas improves system performance. In particular, write generate reduces the number of bus cycles by making write misses more efficient than write allocate or write around or software-implemented write validate on miss.

A method for updating cache memory in a multiprocessor system having shared memory, includes allocating a first area of shared memory as being for data that is written before being read, and indicating at one of line or page units of shared memory that a given unit is write before read. At another step a write operation is implemented data through cache memory for a shared memory address within the write before read area by (1) updating a tag for a first line of the cache memory corresponding to the shared memory address without reading from shared memory, (2) writing the data to a corresponding portion of the first line irrespective of whether the data is a byte, word, or double word and irrespective of whether the data is word-aligned in the first line, (3) setting a third status for the first line denoting valid data is present; and (4) setting a second status for the first line denoting that the first line has been write generated. At another step the second status is checked during a later write operation to the first line to determine whether to treat the later write operation as a cache miss.

A multiprocessor system for implementing the method includes a plurality of program processors, shared memory, dual port memory, a pair of serial I/O channels, a control processor and external cache memory. The shared memory is accessible by each one of the plurality of program processors via a shared memory bus. The dual port memory is coupled to the shared memory bus and has a first port and a second port. The pair of serial I/O channels is accessible by each one of the plurality of program processors via the dual port memory. A first I/O channel of the pair is for receiving first data from outside the cluster. A second I/O channel of the pair is for outputting second data received from within the cluster. The first port of dual port memory is coupled to the pair of I/O channels and the second port is coupled to the shared memory bus.

The control processor is for (1) scheduling processing tasks among program processors, (2) managing time-shared I/O operations to and from respective program processors across the pair of serial I/O channels, and (3) managing communication between program processors. The external cache memory is coupled to the shared memory bus. A first area of shared memory is allocated as being for data that is written before being read. The first area is allocated in one of line or page units of shared memory. A first status is associated with each unit indicating whether the unit is write before read.

The external cache memory has a cache write generate mode. During such mode a write generate operation validates an address in the first area on a cache-write miss without reading data from shared memory. The write generate operation includes, (1) updating a tag for a first line of the cache memory corresponding to the first area address without reading from shared memory, (2) writing the data to a corresponding portion of the first line irrespective of whether the data is a byte, word, or double word and irrespective of whether the data is word-aligned in the cache memory line, (3) setting a third status for the first line denoting valid data is present; and (4) setting a second status for the first line denoting that the first line includes dirty data. The second status is checked during a later write operation addressing the first line to determine whether to treat the later write operation as a cache miss.

The invention will be better understood by reference to the following detailed description taken in conjunction with the accompanying drawings.

BRIEF DESCRIPTION OF THE DRAWINGS

FIG. 4 is a chart of the control hierarchy for the system of FIG. 3.

FIG. 5 is a chart of the communication hierarchy for the system of FIG. 3.

FIG. 11 is the dual MIN of FIGS. 8–10 as mapped according to an embodiment of the routing process of this invention for a sample routing permutation.

FIG. 12 is a link connection chart of the permutations shown in FIG. 11.

DESCRIPTION OF SPECIFIC EMBODIMENTS

Overview

Figure 1A:
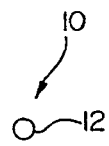
FIGS. 1a–1d are node diagrams of conventional n-cube architectures for n=0 through n=3.
Figure 1B:
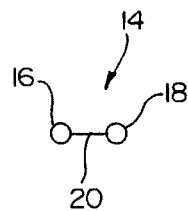
Figure 1C:
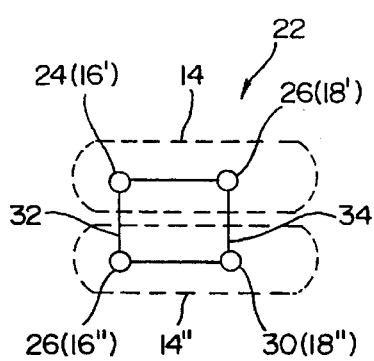
Figure 1D:
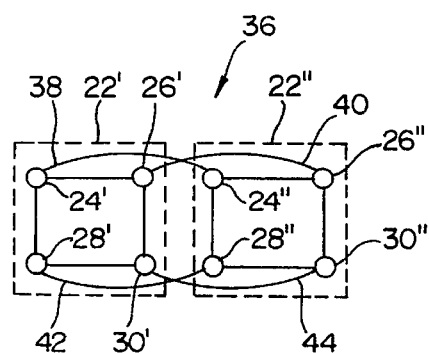
Figure 2:
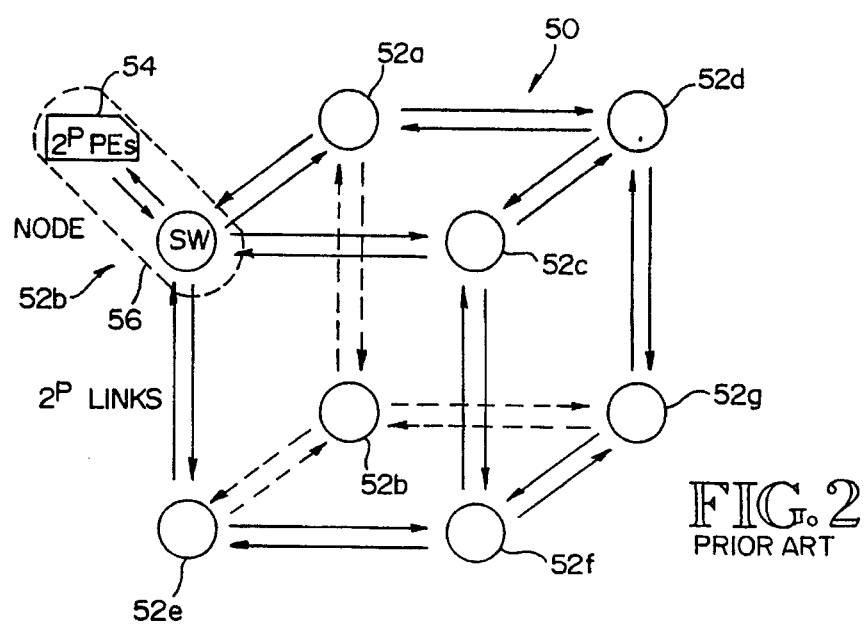
FIG. 2 is a node diagram of a prior art generalized folding cube for n=3.
Figure 3:
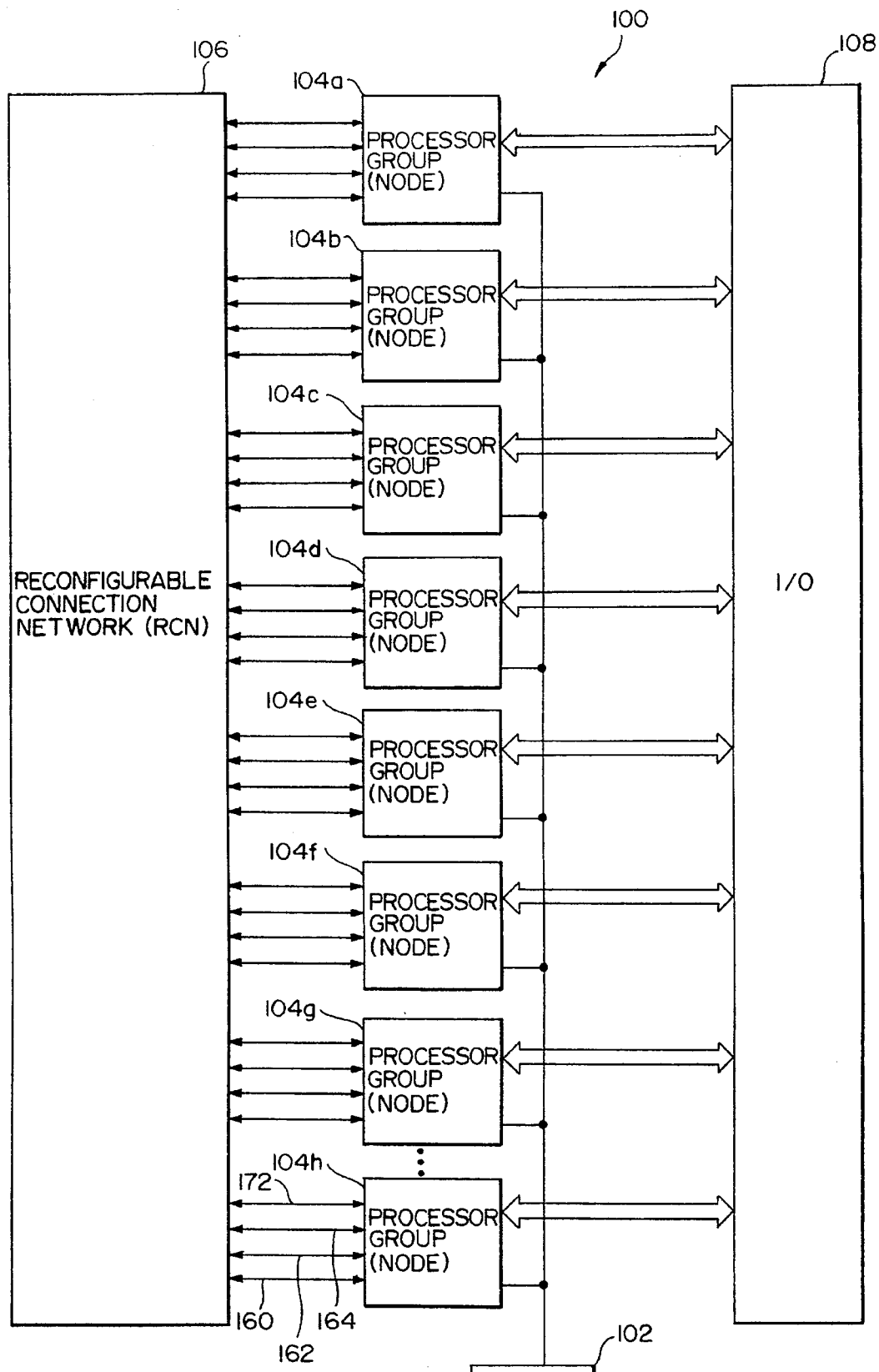
FIG. 3 is a block diagram of a reconfigurable multiprocessor system according to an embodiment of this invention.

The multiprocessor system of this invention is a highly parallel, multiple instruction, multiple data (MIMD) machine optimized for large granularity tasks such as computer vision and image processing. More specifically, the system is a single program, multiple data (SPMD), distributed memory, image multiprocessor system. FIG. 3 is a block diagram of a multiprocessor system 100 according to an embodiment of the invention. The system 100 includes a host computer 102, a plurality of processor groups 104, a reconfigurable connection network 106 and an I/O network 108. An Ethernet 110 couples the host 102 to each processor group 104.

The host 102 is a general purpose UNIX workstation which manages system operation, user interaction, and output collection. The processor groups 104 are multiprocessor nodes coupled through the reconfigurable network 106. The I/O network 108 couples I/O devices to the processor groups 104. Each processor group 104 includes multiple processor clusters 114 (see FIG. 14), which in turn include multiple program processors 126 (see FIG. 16). The program processors 126 implement the application tasks.

The system 100 has hierarchical control and communication structures. FIG. 4 shows the system 100 control hierarchy. The host 102 is at the top of the control hierarchy, controlling processor groups 104 via Ethernet 110. Next are the processor groups 104, which include respective multiple processor clusters 114. A group controller within the group controls the clusters via a VME bus 120. Next, is the processor cluster which includes multiple program processors 126. A cluster controller of the cluster 114 controls the program processors 126 through shared memory and a shared memory bus 138.

FIG. 5 shows the communication hierarchy. Conventionally, a host controls all communications in a hypercube system. According to an embodiment of this invention, however, the communication structure is hierarchical with the host controlling only inter-group communications. Such a hierarchy results in shared resources and distribution of control processing and communication overhead. The host 102 controls inter-group communication by mapping routing permutations. The permutations are embedded via commands from the host 102 sent over Ethernet 110 to group controllers 112. The group controllers set their respective crossbar switches accordingly to provide circuit-switched connections from each source node to each destination node of the permutation. When direct link paths have been set for inter-group communications, data passes directly from each source group's requesting cluster to each destination group cluster in another group. As the paths are circuit-switched direct link connections of source node to intermediate node(s) to destination node, store and forward operations are not needed and do not occur along the path.

Within a group, a group's controller 112 controls intra-group inter-cluster communication through commands sent over VME bus 120 to cluster controllers 124. Intra-group inter-cluster communication occurs in parallel with inter-group communication. Inter-cluster communication occurs over direct serial fiber links through a crossbar switch 116 (see FIG. 15). At any time, n+1 clusters 114 in a group 104 may use inter-group connections, while 9–(n+1) clusters 114 may communicate among themselves.

Within a cluster 114, a cluster controller 124 controls intra-cluster communication via messages sent through shared memory. Program processors access shared memory to read the messages and access data. The program processors in a cluster share a fast serial link accessible through a dual port memory 136 (see FIG. 17) to connect to the crossbar switch 116.

Specific examples of communication follow. Referring to FIG. 5, when program processor $PPi_1$ in cluster $j_1$ in group $k_1$ wants to send a block of data to another $PPi_2$ in cluster $j_2$ in group $k_2$, a path is set up under the control of cluster controllers 124 for clusters $j_1$, $j_2$, group controllers 112 for groups $k_1$, $k_2$, and host 102 in a tree fashion depending on the location of the program processors $PP(i_1,j_1,k_1)$ and $PP(i_2,j_2,k_2)$. If $j_1=j_2$, then the cluster controller 124 for cluster $j_1$ sets up the data transfer through shared memory 134. If cluster $j_1$ does not equal $j_2$, but group $k_1=k_2$, then cluster controller 124 for cluster $j_1$ requests group controller 112 of group $k_1(=k_2)$ to set up the path through the crossbar switch 116 of such group. The group controller 112 also informs the receiving cluster $j_2$'s controller 124 to be ready to receive data. If cluster $j_1$ does not equal cluster $j_2$ and group $k_1$ does not equal group $k_2$ then the group controller 112 for group $k_1$ requests the host 102 to set up a path through the reconfigurable connection network (RCN) 106. When the path is available, the host 102 informs all group controllers 112 along the route, including the group controller for group $k_1$, the group controller for group $k_2$ and all intermediate group controllers. Each such group controller sets up their respective crossbar switches 116 to realize the path. Group controllers for the source and destination nodes inform their respective cluster controllers 124 which in turn set up their respective transmission or receiving modes.

Referring again to FIG. 3, the RCN 106 and I/O network 108 provide communication paths for routing data into and among the processor groups 104. In one embodiment RCN 106 is configured as an enhanced hypercube (EHC). For a system 100 with sixteen processor groups (nodes), an n=4 EHC is formed. The EHC is described below as providing an efficient architecture for implementing any arbitrary routing permutation for communication among nodes. For any one or more communication cycles, the host 102 determines a routing permutation enabling every source group 104 to communicate with one distinct destination group 104. The routing permutation is the map of inter-group communication paths for such cycle.

The I/O network 108 couples the processor groups 104 to I/O devices (not shown). For example, in an image multiprocessor embodiment 100 the I/O network 108 couples the processor groups 104 to image source devices. Thirty-two parallel channels (32/N per group) couple the processor groups 104 to the I/O devices. In one embodiment, the peak input rate is twenty-five 256×256 image frames per second on each channel.

In an SPMD image multiprocessor machine embodiment, each program processor 126 of system 100 executes an entire image processing program. According to one embodiment, each program processor 126 executes the same image processing program. Such coarse granularity is useful for high speed image processing in which the image rate is too high for a single processor. If for example, 1,000 image frames per second (fps) are input, but an individual processor can only process 10 fps, then 100 program processors 126 are needed to process the image stream in real time. According to a rotational loading scheme, a first program processor 126 executes every one hundredth image frame (i.e., the first frame, one hundred and first frame, two hundred and first frame, etc.). The results of each program processor 126 are then fed to (1) the host 102 for storage or additional computation, or (2) to an output device via the I/O network 108. According to such scheme, the instruction granularity is one image processing program per program processor 126, while the data granularity is one image frame per program processor 126 per program cycle.

In another MIMD embodiment image processing tasks are split into smaller sub-tasks. Each sub-task is executed by a program processor. The processing tasks are translated into program graphs from which the sub-tasks are mapped onto the system. In effect system 100 partitions the tasks mapping the sub-tasks among the processor groups 104, specifically the program processors 126 through the reconfigurable connection network 106. The communication overhead for the partitioning is small due to the availability of free paths in the circuit-switched RCN 106. Restrictions are not placed on the programmer and program graphs. Also, each processor 126 stores only a small part of the program, saving memory space.

In another MIMD embodiment, a program graph is partitioned among processor clusters. Each cluster is assigned a sub-task. A cluster controller assigns sub-tasks to processors 126 at run rime. Further, the four processors 126 in a cluster may share a sub-task to improve image processing speed. Such mode is useful for real time image processing applications. Such mode also is useful where successive image frames are related. In an example application, output from processing of an early image frame is needed for the next image frame.

Enhanced Hypercube Inter-Group Communication Structure

Communication between groups is through a circuit-switched reconfigurable connection network (RCN) 106.

Physically, the RCN 106 is formed by the interconnection of each crossbar switch 116 within each group 104. In one embodiment the crossbar switches 116 are interconnected to form a rearrangable enhanced hypercube (EHC) structure. The EHC allows arbitrary routing permutations using circuit-switching to achieve free routes between source nodes (i.e., a first group) and destination nodes (i.e., a second group).

Figure 6:
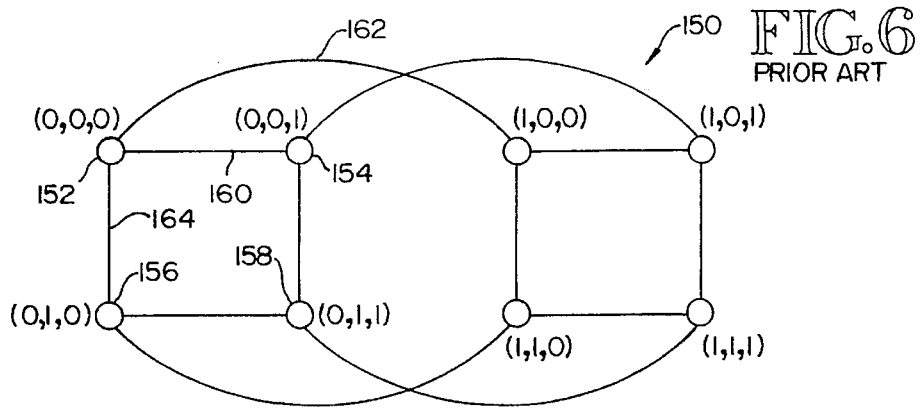
FIG. 6 is a node diagram of a conventional 3-cube having binary node labels.

Mathematically a conventional hypercube may be interpreted as an undirected graph $Q_n=(V,E)$, where n specifies the hypercube dimensions, V specifies the total number of nodes (vertices), and E specifies the number of links (edges). FIG. 6 shows a 3 dimensional hypercube 150 in which each node is labeled with a binary bit pattern. The nodes are labeled recursively starting with a first 0-cube node 152. The 0-cube node 152 is labeled (0,0,0). Another 0-cube node 154 is linked to the first node 152 to form a 1-cube. The added node 154 is labeled (0,0,1). The pair then are linked with another 1-cube in which the added nodes 156, 158 are labeled (0,1,0) and (0,1,1) to form a 2-cube. Similarly two 2-cubes are linked to form a 3-cube.

Given an n-cube as in FIG. 6, a directed link between two nodes is defined as a $k^{th}$ dimension (k-D) link if the binary label of the two end nodes differ only in the kth bit position. For link 160, the end nodes, node (0,0,0) and node (0,0,1), differ only in the first bit position. Thus, the link 160 is a 1-D link. Similarly for link 162, the end nodes (1,0,0) and (0,0,0), differ only in the third bit position. Thus, the link 162 is a 3-D link.

Figure 7:
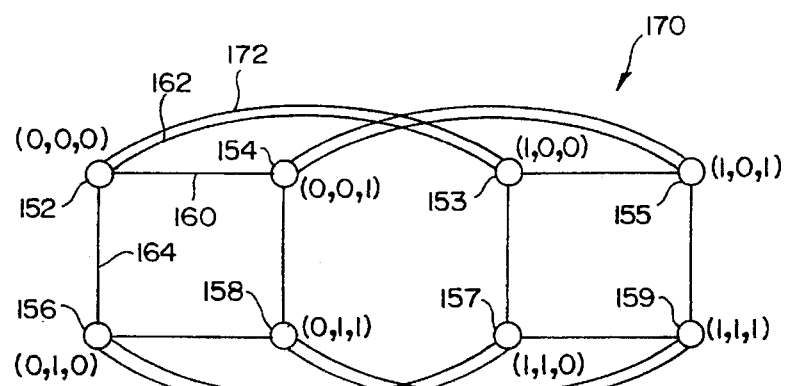
FIG. 7 is a node diagram of an enhanced hypercube (EHC) according to an embodiment of this invention.

FIG. 7 shows an enhanced hypercube (EHC) 170 for n=3 according to an embodiment of this invention. The EHC 170 has a similar architecture as the hypercube 150 of FIG. 6, except every node has one added link in a given dimension. In the embodiment shown, each node has an added link in the $3^{rd}$ dimension. Thus, node (0,0,0) has two 3-D links 162, 172 (i.e., links to node (1,0,0)), one 2-D link (i.e., link to node (0,1,0)) and one 1-D link 160 (i.e., link to node (0,0,1)).

In general terms, the enhanced n-cube hypercube has $N=2^n$ nodes; each node has one k-D link for every k, where k=1 to n; plus one additional link for k=K, where K can equal any one of 1, . . . , n and is the same for each node. Thus, each node has n+1 directed links: one 1-D link, one 2-D link, one 3-D link, plus one K-D link. In the embodiment shown K=3. The advantage of the enhanced hypercube is that arbitrary circuit switching permutations can be embedded onto the network.

Referring to FIGS. 3 and 7, an enhanced hypercube embodiment of RCN 106 has nodes 152–159 which correspond to the groups 104a–h. For a 3-cube EHC having 8 nodes (groups), there are four links 160, 162, 164, 172 for each node.

Arbitrary Circuit-Switching Permutations in the EHC

A routing permutation is a set of source nodes and their destination nodes. For example, in a 4 node system having nodes 0 to 3, one permutation is: node 0 sourcing to a destination at node 2; node 1 sourcing to a destination at node 0; node 2 sourcing to a destination at node 3; and node 3 sourcing to a destination at node 1. Such permutation is designated [2,0,3,1]. Typically, it is desired to implement such communication permutation as quickly as possible (i.e., one communication period). An objective is to maximize network throughput with minimum cost in terms of path length. As systems get more complex (i.e., increasing number of nodes), however, it is difficult to achieve free paths simultaneously for each source/destination combination.

In a hypercube the path length between source and destination is measured in terms of "hamming distance." The hamming distance between any two nodes in a hypercube is defined by the number of bit positions that vary. Nodes (1,1,0) and (1,0,1) differ in two bit positions. Thus, the hamming distance is two. The length of the shortest route between any two nodes is equal to the hamming distance.

In hypercubes many source/destination combinations may need to use the same link. Such link is said to be congested. If store and forwarding operations are not done and all communication occurs simultaneously during a communication cycle, then many paths are blocked preventing the permutation from being implemented. Arbitrary permutations are difficult to implement. As a result, some systems limit permutations so that even nodes can only talk to even nodes and odd nodes can only talk to odd nodes. (i.e., non-arbitrary permutations).

A conventional routing process, which could be used in packet switching or circuit switching networks, is a recursive routing algorithm. According to a recursive algorithm, each node redirects a message to a next node on a particular dimensional link which is a "1" in the exclusive "OR" (relative address) of the current node and the destination node address. For example, a source node (1,1,0) request communication with node (1,0,1) has a choice of transmitting to node (1,1,1) or node (1,0,0). Conventionally, when there is more than one choice, the selection is made randomly. If a link is congested and the path cannot be formed, the route is considered blocked and the recursive algorithm backtracks and selects one of the other choices not taken earlier. For larger sized hypercubes (n>=5), the blocking probability on a circuit switched network implementing such a recursive routing algorithm approaches one. As a result, prior research has focused extensively on the packet switching approach. As discussed in the background, however, packet switching causes high overhead in terms of time delays and processing.

According to the EHC structure of this invention, any arbitrary permutation can be mapped onto a system 100 for any n, where during a communication period, each source node has one transmission to a distinct destination node. Thus, no two source nodes communicate with the same destination node during the same communication period. Store and forwarding is not required to achieve such mapping. Instead, all routes are available simultaneously to implement the permutation.

Selection and mapping of permutations is done by the host 102 in the system 100.

Figure 8:
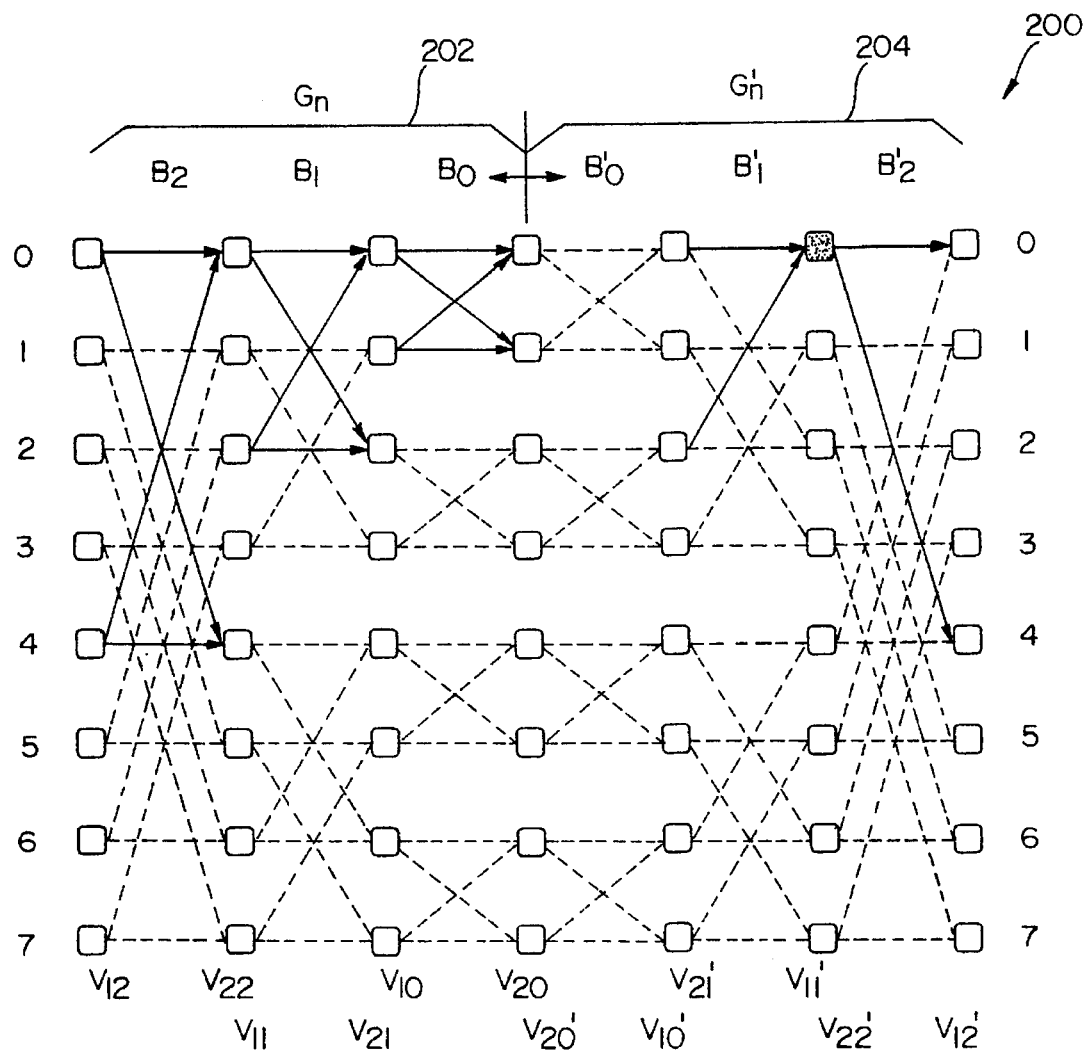
FIG. 8 is an equivalent dual multistage interconnection network (MIN) graph for the EHC of FIG. 7.

To determine the communication routes, the enhanced hypercube structure first is transformed into an equivalent multistage interconnection network (MIN) 202 graph (step 1) (see FIG. 8). A copy 204 then is made of the graph, with the two copies placed side by side to achieve a dual MIN 200. (step 2). The dual MIN 200 is then split into two sub-MIN networks 206, 208 (step 3) (see FIG. 9). For a double link hypercube each of the two sub-MIN networks can be used to route a permutation. If each node has two processors as for a GFC, then one network can route a permutation for a first processor of each pair, while the second MIN can route a permutation for a second processor of each pair. For the enhanced hypercube 170, the additional link in any one dimension enables any arbitrary permutation to be mapped onto the hypercube 170 without being blocked (step 4). For convenience, the nodes of EHC 170 are designated as nodes 0–7 in the following discussion. Thus,

| | |
|---|---|
| node 152 = node 0 | node 153 = node 4 |
| node 154 = node 1 | node 155 = node 5 |
| node 156 = node 2 | node 157 = node 6 |
| node 158 = node 3 | node 158 = node 7 |

Each step 1–4 is discussed below in detail.

Step 1: Define an equivalent MIN graph 202. To visualize the permutation mapping, the EHC is expanded into a multistage interconnection network (MIN) $G_n$ of cascaded bipartite graphs $B_k$. Each bipartite graph $B_k$ is two node sets linked together by imaginary self connections and communication links. Each node set includes the $2^n$ nodes of the EHC. A mirror image MIN $G'_n$ then is made and coupled to the original MIN. The dual MIN $G_n \cdot G'_n$ then is split into four sub-MINs, $U[G_n]$, $L[G_n]$, $U[G'_n]$, $L[G'_n]$. The upper portions $U[\,]$ correspond to N/2 nodes where $N=2^n$. Using an 8 node example, the upper portions correspond to nodes 0–3, while the lower portions correspond to nodes 4–7.

In a boolean n-cube, $Q_n=(V,E)$, the set of virtual self-connections is a set of directed links from each node to itself and denoted by:

$$E_s=\{(v_i \to v_i)|\forall v_i \in V\}.$$

The self-connection is only a mathematical convenience having no physical equivalent. For each dimension $k \in \Phi = \{0,1,2,\ldots,n-1\}$, it is assumed that one self-connection is present at each node. The set of k-D connections including self-connections is denoted by $\epsilon_k = E_k \cup E_s$ to be distinguished from the set of real links $E_k$. The hypercube, $Q_n=(V,E)$, then is transformed into 2n bipartite graphs $B_i$ (step a). The graphs are cascaded (step b) to reflect communication links, resulting in a MIN $G_n$ 202 as shown in FIG. 8 for the n=3 EHC 170 of FIG. 7. The transformation steps a and b are described below:

Step a: For each dimension $k \in \Phi$ of connection, make two copies of the node set V called $V_{1,k}$ and $V_{2,k}$. For every node $v_i \in V$, $0 \le i \le N-1$, there are corresponding nodes $v_i^{1,k} \in V_{1,k}$ and $v_i^{2,k} \in V_{2,k}$. Then, the connecting relation of k-D links is mapped onto a directed bipartite graph $B_k=(V_{1,k}, V_{2,k}, \epsilon_k)$, where $V_{1,k}$ is the input node set of $B_k$, $V_{2,k}$ is the output node set, and $\epsilon_k$ is the directed link set of k-D connections including self connections.

Step b: Cascade the bipartite graphs $B_k$ such that the output node set $V_{2,k}$ of $B_k$ coincides with the input node set $V_{1,k-1}$ of $B_{k-1}$ for $k=n-1,\ldots,1$. A node $v_i^{2,k} \in V_{2,k}$ and a node $v_i^{1,k-1} \in V_{1,k-1}$ become one and the same node. This graph is referred to as graph $G_n$ 202.

Step 2: Make a copy of $G_n$ which is the mirror image with respect to $V_{2,0}$ in $G_n$. This copy is referred to as $G'_n$ 202. Each bipartite graph in $G'_n$ is represented by $B'_k=(V'_{2,k}, V'_{1,k}, \epsilon'_k)$ for $k=0,\ldots,n-1$, where $V'_{1,k}$ is a copy of $V_{1,k}$ in $B_k$ and $V'_{2,k}$ is a copy of $V_{2,k}$ in $B_k$.

FIG. 8 shows the synthesized MIN graph 200, $G_n \cdot G'_n$. Both "$\cdot$" and "$\amalg$" denote the concatenation of bipartite graphs.

$$G_n \cdot G'_n = \prod_{i=n-1}^{0} (V_{1,i}, V_{2,i}, \epsilon_i) \cdot \prod_{j=0}^{n-1} (V'_{2,i}, V'_{1,i}, \epsilon'_i)$$

$$= \prod_{i=n-1}^{0} B_i \cdot \prod_{j=0}^{n-1} B'_i$$

Referring to FIG. 8, the dashed lines represent a real directed link in each connection, while a dotted line represents a self connection. A solid line corresponds to a switch. The transformed graph has the following properties: (1) The graph is symmetric with respect to $V_{2,0}$ (or $V'_{2,0}$). (2) Every bipartite graph $B_k$ (or $B'_k$) consists of $2^{n-1}$ disjoint subgraphs. (3) Each subgraph in $B_k$ (or $B'_k$) corresponds to a pair of k-D links which connect two neighboring nodes $v_i$ and $v_{i \oplus 2^k}$. (4) From the properties 2 and 3, it is seen that $2^{n-1}$ pairs of links in the k-D connection, which are parallel (disjointed) with each other, are mapped into the corresponding bipartite graph $B^k$ (or $B'_k$). (5) All bipartite graphs are isomorphic to each other (i.e., they retain the symmetry properties of a hypercube).

Figure 9:
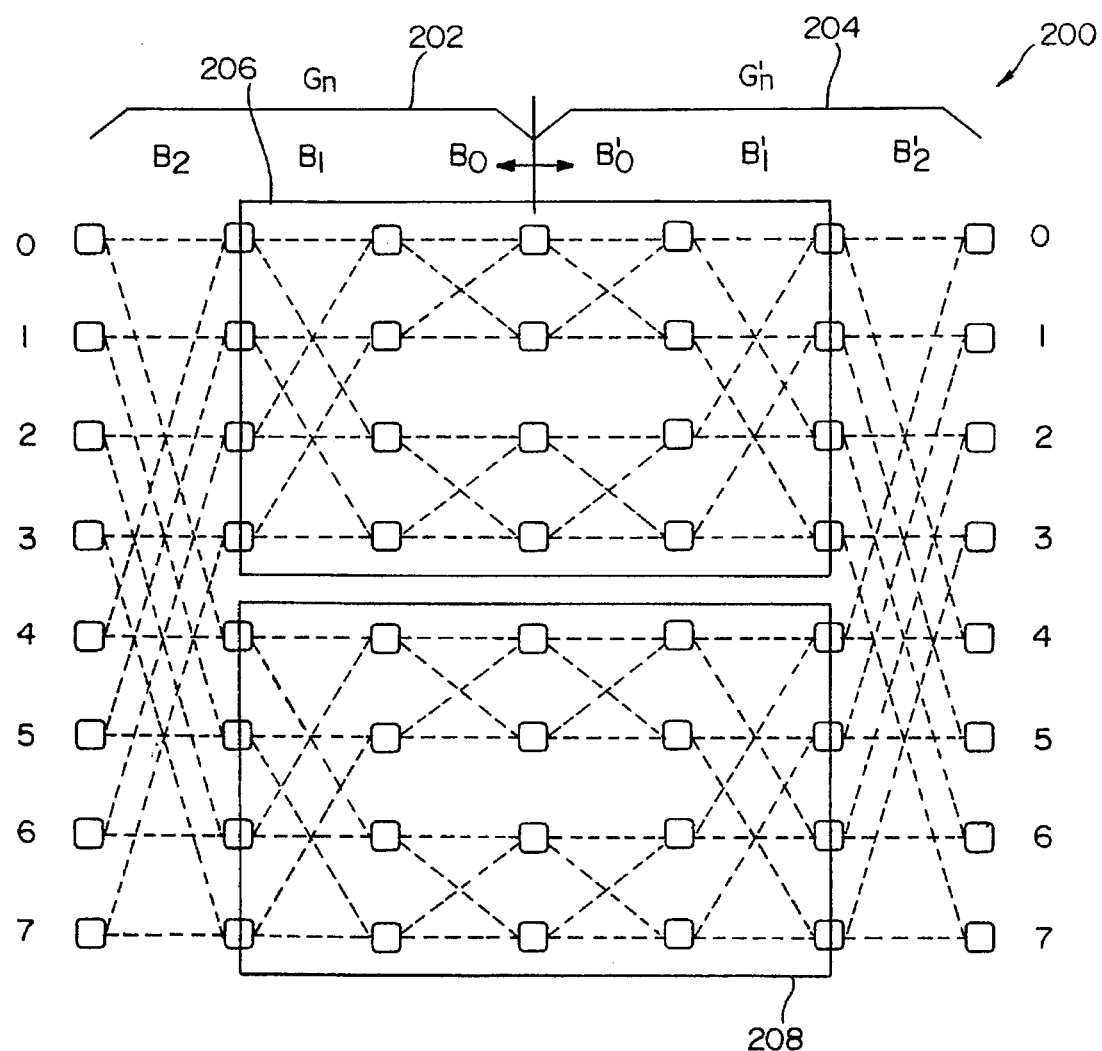
FIG. 9 is the dual MIN of FIG. 8 divided into two sub-MINs.
Figure 10:
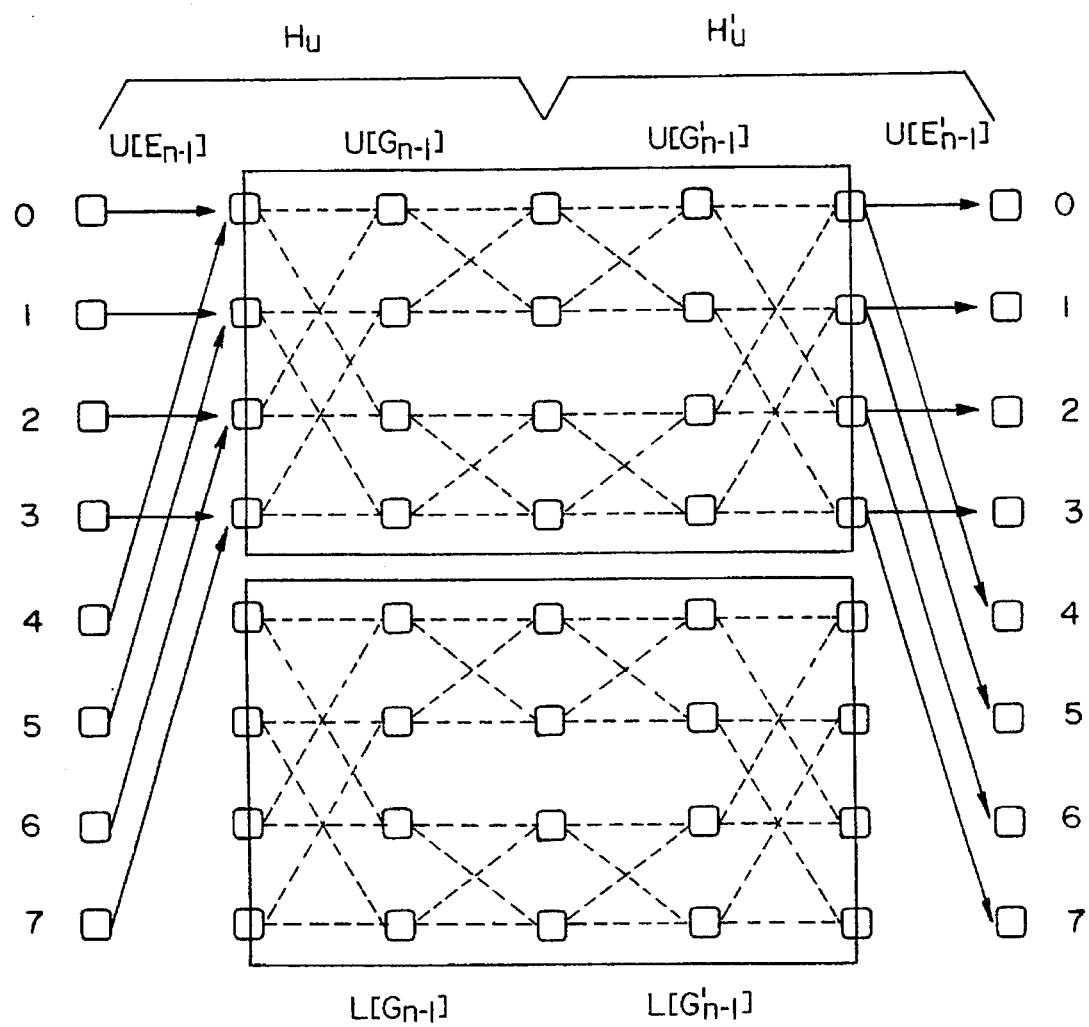
FIG. 10 is the dual MIN of FIGS. 8 and 9 further divided into four sub-MINs.

Step 3: The dual MIN 200 is split into two sub MINs 206, 208. FIG. 9 depicts a graph model of a MIN 200 with $N=2^n$ inputs/outputs and 2n stages consisting of 2×2 switches. Under one interpretation a node of the graph represents a 2×2 switching element of the network and a link represents a communication line of the network. Thus, the graph 200 of FIG. 9 represents the equivalent of a hypercube in which each k-D connection is regarded as a 2×2 switch; one input and one output of the switch are real links and the other input and output are pseudo links. Referring to FIG. 10, let $G_{n-1} = \prod_{i=n-2}^{0} B_i$ and $G'_{n-1} = \amalg_{j=0}^{n-2} B'_j$. $U[G_{n-1}]$ and $L[G_{n-1}]$ are used to denote the upper and lower subgraphs of $G_{n-1}$, respectively (see FIG. 10). $U[\epsilon_{n-1}]$ denotes the subset of $\epsilon_{n-1}$ that is incident upon $U[G_{n-1}]$, and $L[\epsilon_{n-1}]$ denotes the subset of $\epsilon_{n-1}$ that is incident upon $L[G_{n-1}]$. Similar notation is used for the graph $G'_{n-1}$. Viewed as hypercubes, $U[\epsilon_{n-1}] = L[\epsilon'_{n-1}]$. The graph $G_n \cdot G'_n$ then is divided into four components (i.e., $H_U$, $H'_U$, $H_L$ and $H'_L$). Here the two synthesized networks 206, 208 are represented in FIG. 10 as:

$$H_U \cdot H'_U = U[\epsilon_{n-1}] U[G_{n-1}] \cdot U[G'_{n-1}] U[\epsilon'_{n-1}]; \text{ and}$$

$$H_L \cdot H'_L = L[\epsilon_{n-1}] L[G_{n-1}] \cdot L[G'_{n-1}] L[\epsilon'_{n-1}]$$

The two are the equivalent of two independent rearrangable networks with N inputs/outputs. The left-most nodes ($V_{1,n-1}$) and right-most nodes ($V'_{1,n-1}$) of the graph $G_n \cdot G'_n$ are considered only as input and output ports, respectively. Each of these networks 206, 208 can route one permutation each. Thus, a double link hypercube can route two permutations simultaneously.

Step 4: An enhanced hypercube as shown in FIGS. 7–10 can route any arbitrary permutation without being blocked. Referring to FIG. 10, in $H_U \cdot H'_U$, the routing paths that are established in $H'_U$ can be directly mapped into the subbipartite graphs in $H'_L$. Thus, $H_U$ and $H'_L$ can be considered as another rearrangable network, provided the outputs of $H_U$ are directly connected to the inputs of $H'_L$. This model is represented as:

$$M_1 = U[\epsilon_{n-1}] U[G_{n-1}] \cdot 2U[E'_{n-1}] \cdot L[G'_{n-1}] L[\epsilon'_{n-1}];$$

or $$M'_1 = L[\epsilon_{n-1}] U[G_{n-1}] \cdot 2L[E'_{n-1}] \cdot U[G'_{n-1}] U[\epsilon'_{n-1}]$$

where $2U[E'_{n-1}]$ and $2L[E'_{n-1}]$ mean two (n−1)-D directed links from $G_{n-1}$ to $G'_{n-1}$. $2L[E_{n-1}]$ and $2U[E_{n-1}]$ can also be used in place of $2U[E'_{n-1}]$ and $2L[E'_{n-1}]$, respectively. $H_U \cdot 2U[E'_{n-1}] \cdot H'_L$ is depicted in FIG. 10. In the enhanced hypercube we omit $2U[E'_{n-1}]$ and $2L[E'_{n-1}]$.

When a subpath is mapped from $H'_U$ to $H'_L$, if a message pi(i) already arrives at its destination in $U[V_{2,0}]$, it makes a cycle in the hypercube, since it visits its destination twice. Thus, we do not have to map this kind of subpath assuming that the path for the corresponding connection request is established. After mapping, successively repeated nodes should be removed from the paths established in $H_U \cdot H'_U$ to eliminate pseudo links. Every resulting route in the hypercube consists of as most $2 \log_2 N$ intermediate nodes and $2 \log_2 N + 1$ intermediate links in the hypercube.

Thus, step 4, routing through the EHC involves: (a) path set-up in $H_U \cdot H'_U$; (b) mapping from $H'_U$ to $H'_L$; and (c) elimination of pseudo links.

Below, a proof is presented to show that the addition of any pair of links to each connection in any one dimension (i.e., the EHC) enables a conflict free route for every permutation. Thus, any arbitrary permutation can be mapped onto the hypercube.

Proof: There are no overlapped links between $U[G_{n-1}]$ and $L[G'_{n-1}]$. Thus, all links in $Q_{n-1}^U$ for $U[G_{n-1}]$ and $Q_{n-1}^L$ for $L[G'_{n-1}]$ are used only once. If one additional pair of links is provided in the (n−1)-D connection, which connects the two sub-cubes $Q_{n-1}^U$ and $Q_{n-1}^L$, there exists two links in either direction of each (n−1)-D connection. As shown in FIG. 10, each direction is used twice. That is, two links in one direction are used from $L[V_{1,n-1}]$ ($Q_{n-1}^L$) to $U[V_{1,n-2}]$ ($Q_{n-1}^U$) and from $L[V'_{2,n-1}]$ ($Q_{n-1}^L$) to $U[V'_{1,n-1}]$ ($Q_{n-1}^U$); two links in the other direction are used from $U[V_{2,0}]$ ($Q_{n-1}^U$) to $L[V'_{2,0}]$ ($Q_{n-1}^L$). Thus, only the (n−1)-D connection requires two pairs of links. Based on property (5) of the transformed graph above, any dimension can be used in place of the (n−1)-D connection.

As an example, consider the permutation [6,3,4,0,2,7,1,5]. FIG. 11 shows the set-up paths in $H_U \cdot H'_L$. FIG. 11 also shows the permutation mapping from $H'_U$ to $H'_L$ for each node of EHC 170. Notice that in the 5th row of the left column of FIG. 11, the subpath containing (4) is not mapped from $H'_U$ to $H'_L$ as it causes a cycle. Removal of pseudo links is depicted in the right column. In both columns, the first and last numbers in parentheses represent a source and a destination node address, respectively, while the numbers between them represent intermediate node addresses.

The EHC 170 having the added link 172 is found to be an economical architecture. It requires only N/2 additional links relative to the conventional hypercube 150 and can embed any arbitrary permutation. The routing process does not provide the shortest path for each source/destination connection request. Compared with the diameter of the conventional hypercube, a maximum path is about twice as long (i.e., $2(\log_2 N)+1$). However, such difference is not significant in a circuit switching environment, because there is no time delay in the intermediate nodes (other than the insignificant electronic propagation delays).

Figure 13:
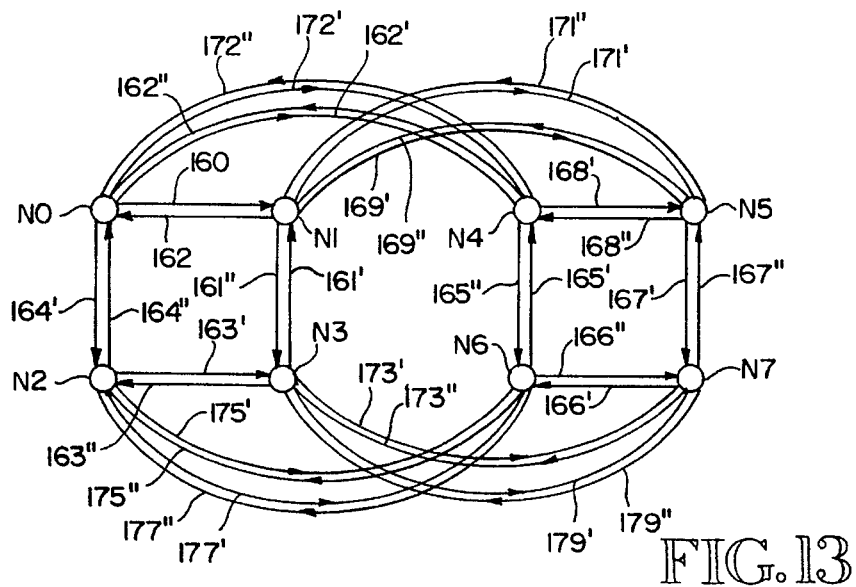
FIG. 13 is the EHC of FIG. 7 showing the directional links forming communication paths to implement the sample routing permutation of FIGS. 11 and 12.

An implementation of the routing process with respect to FIG. 13 is described below in which each full duplex link is depicted with its component directional paths. Thus, link 160 is shown as links 160' and 160" for routing data between nodes 0 and 1 in opposite directions. To implement a permutation for all nodes $N_0$ to $N_7$ simultaneously without any blocked links, each directional link can be used only once in the permutation. Mapping the permutation of FIGS. 11 and 12 onto the EHC 170 as depicted in FIG. 13 shows:

(0) the route from source node 0 to destination node 6 consists of the path connection of links 162' and 165";

(1) the route from source node 1 to destination node 3 consists of the path connection of links 160', 172', 168', 167' and 173"

(2) the route from source node 2 to destination node 4 consists of the path connection of links 164", 160", 169' and 168";

(3) the route from source node 3 to destination node 0 consists of the path connection of links 173', 166', 165' and 162";

(4) the route from source node 4 to destination node 2 consists of the path connection of links 172", and 164';

(5) the route from source node 5 to destination node 7 consists of the path connection of links 171", 161", 166", 177' and 166";

(6) the route from source node 6 to destination node 1 consists of the path connection of links 175", 163', 179', 167", and 169"; and (7) the route from source node 7 to destination node 5 consists of the path connection of links 179", 161', and 171".

Accordingly, each link is used only once in each direction to implement the permutation. By using this process, any permutation from a given source to a distinct destination can be mapped onto the EHC 170 without being blocked.

The routing process can be more broadly explained as a total of 2n+1 routing steps where n is the dimension of the EHC. At the first step, a first set of N/2 nodes (i.e., node 0 to node N/2−1) receive connections with a second set of N/2 nodes (i.e., node N/2 to node N−1). The next n−1 steps involve mapping within the first node set. A recursive Benes looping algorithm is used at n−1 steps to map within the first node set. (Such algorithm is presented in C language format within appendix A). During the next step, each pair of requests at each of the nodes in the first node set is switched to the second node set. The next n−1 steps involve mapping within the second node set during which one-half of the communications reach their destination nodes. Again, a recursive Benes looping algorithm is used at the n−1 steps to map within the second node set and complete one-half of the routes. During the last step, the other one-half of the requests are switched back to the first node set at the respective destination nodes (i.e., node 0 to node N/2−1).

Processor Group Architecture

Figure 14:
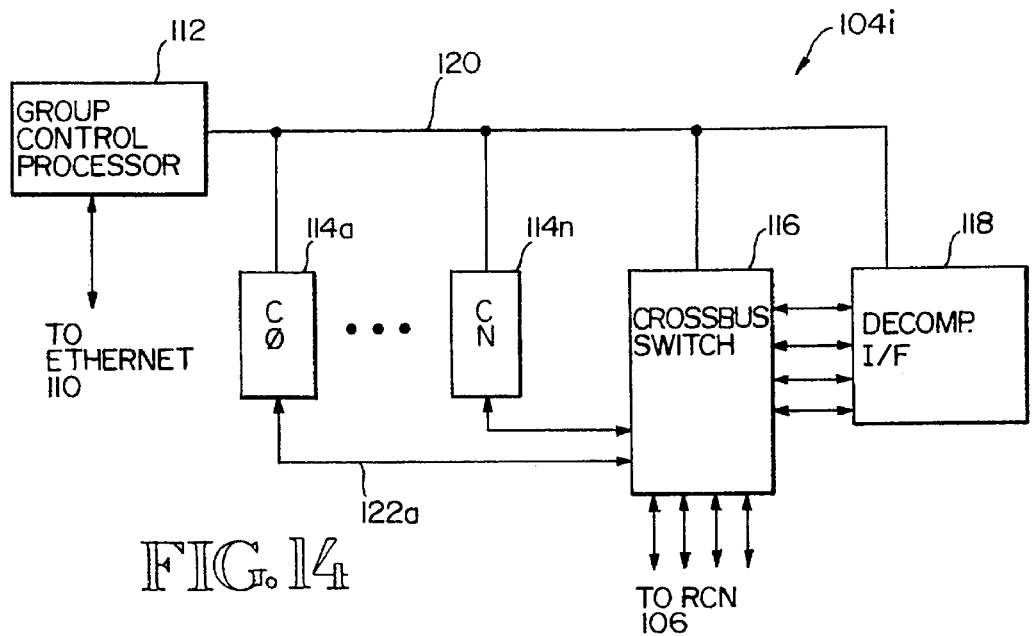
FIG. 14 is a block diagram of a processor group (node) for the system of FIG. 3.

FIG. 14 is a block diagram of a processor group 104i. The group 104i includes a group controller 112, a plurality of processor clusters 114, a 16×16 crossbar switch 116 and a decompressor interface 118. Communication with the host 102 is over Ethernet 110. Cluster control is implemented with commands passed over a VME bus 120. In one embodiment, nine clusters 114a through 114i are included in each group 104i.

In one embodiment the group control processor is an Intel i960 processor. The group control processor 112 coordinates all activities within group 104i. It assigns tasks to each cluster 114 and sets up communication paths. In addition, the group controller 112, through VME bus control registers, reads send requests and activates group destination clusters 114. Movement of data is synchronized with each image frame transmission and is completed within a fixed time. The group controller 112 sets up the crossbar switch 116 via the VME bus 120. Configuration of the switch 116 is synchronized for all groups 104. Asynchronous communication, under the control of the group controller 112, occurs for communications restricted to intra-group transmissions.

Figure 15:
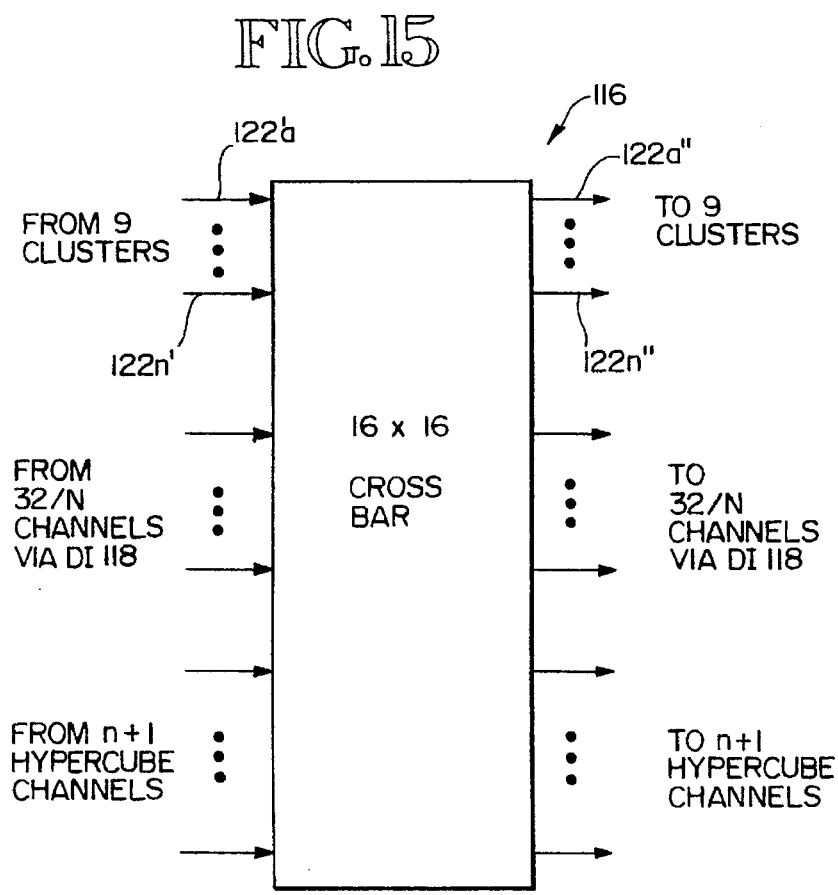
FIG. 15 is a block diagram of a crossbar switch of the processor group in FIG. 14 forming a portion of the reconfigurable connection network of FIG. 3.

FIG. 15 shows a crossbar switch 116 which accepts up to 16 input links and connects them to 16 output links. Each input is a 200 Mbit/second fiber link that can be connected to any one of the 16 outputs. The 16 links on the input side are coupled to the nine clusters 114 in the group 104i (e.g., 9 links), to the output from (he decompressor interface 118 (e.g., 32/N links) and to hypercube connections to other crossbar switches (e.g., 4 links). In one embodiment, the system is designed to accommodate n=3 to n=5 hypercubes. Thus, up to 6 links can be needed for hypercube communications. Thus, a total of 19 channels may be needed. To accommodate 19 input channels, the 4 to 6 hypercube channels and 9 cluster channels are multiplexed under the control of the group controller 12. When all n+1 hypercube channels are needed, then 16–(32/N)–(n+1) channels are used for inter-cluster communication during a specific communication period. Thus, for the system 100 in which n=3 and N=8, up to 4 channels may be used for hypercube communications. When all 4 are used, then 16–4–4=8 lines are available for inter-cluster communication. If less than all four hypercube channels are used during a communication period, then 9 channels are available for inter-cluster communication.

Similarly on the output side, the 16 links are coupled to the nine clusters 114 in the group 104i (e.g., 9 links), to the input of the decompressor interface 118 (e.g., 32/N links) and to hypercube connections of other crossbar switches (e.g., 4 links). Multiplexing also is performed to allocate output channels.

The crossbar switch 116 includes control logic which receives the connection request from the group control processor 112 via the VME bus 120. The connection request specifies a one-to-one configuration from any source input channel to any destination output channel or a permutation specifying all input channel output channel connections. For the permutation the source address of each destination node is specified. Connection requests occur one time slot in advance. Thus, registers for the current configuration and next configuration are included with each crossbar switch 116.

Referring again to FIG. 14, the decompressor interface (DI) 118 receives formatted image frames from the I/O network 108, then checks the validity, extracts the image frames, buffers the image data and transmits image data to clusters when a link through crossbar switch 116 is available. The decompressor interface 118 input data format includes: unique frame ID, frame starting bits and frame ending bits. Each interface 118 channel receives 3500/32 frames/sec using all 32 I/O channels.

The DI 118 has four memory buffers for each channel. Each memory buffer is 64k bytes which are used for storing preprocessed image frames to be transferred to the clusters 114. The group control processor 112 queries the DI 118 once every synchronization cycle to determine whether a DI channel has an image buffer to transmit. If an image frame is available, it is scheduled for transmission to a specific cluster 114 through the path requested by the group control processor 112.

Processor Cluster Architecture

Figure 16:
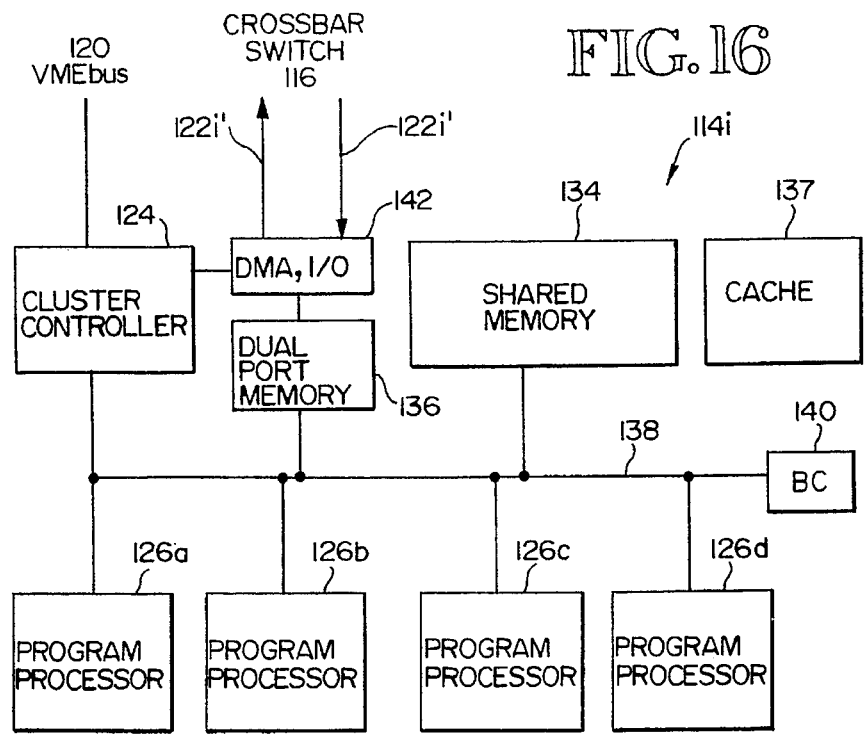
FIG. 16 is a block diagram of a processor cluster of FIG. 14.

FIG. 16 shows a processor cluster 114i, including a cluster controller 124, four program processors 126, shared memory 134, dual-port shared memory 136, a shared memory bus 138 with bus controller 140, and a DMA I/O system 142 for directing communication to the crossbar switch 116 over a pair of high speed serial I/O channels 122i', 122i". In the image multiprocessor embodiment having eight groups 104, nine clusters 114 per group, and four program processors 126 per cluster, the system throughput rate is 20 Giga-flops (80 Giga-flops peak).

Figure 17:
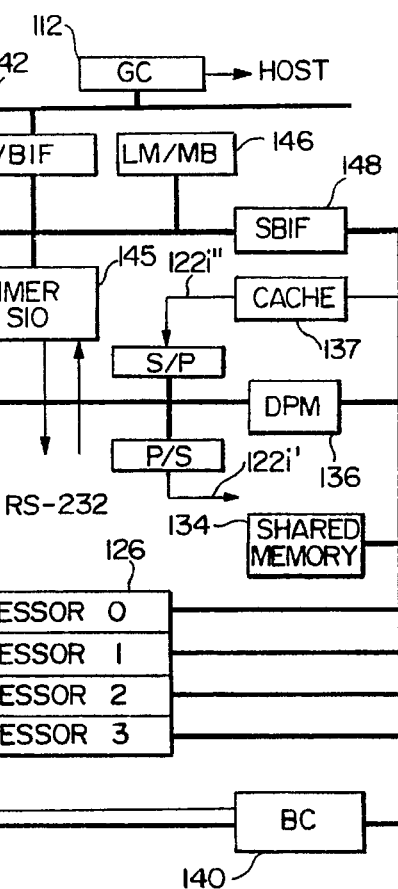
FIG. 17 is a more detailed diagram of the processor cluster of FIG. 16.

Referring to FIG. 17, the cluster controller 124 includes a cluster control processor 144, a timer and serial I/O port 145, a local memory/message buffer 146, a VME bus interface 147, and a shared memory bus interface 148. Under direction from the group controller 112, the cluster control processor 144 schedules tasks among the program processors 126 and DMA-I/O system 142, handles errors, manages shared memory 134 and dual port memory 136 and arranges for receiving and dispatching data by serial I/O. Memory management includes transferring messages among the local memory/message buffer 146, shared memory 134, dual port memory 136 and group control processor memory.

The cluster control processor 144 is an Intel i960. It handles interrupts from the bus controller 140, group control processor 112, crossbar switch 116, the cluster timer and serial I/O port 145, the DMA-I/O system 142 and the program processors 126.

Each program processor 126 is a 64-bit 40 MHZ Intel i860 RISC processor having an internal 12 kbyte cache. Eight kbytes are allocated for data, and four kbytes are allocated for instructions. In addition a 64 entry translation lookaside buffer is included. The program processors 126 support pipelined execution with a RISC paradigm, using an independent core/integer unit, and a floating point/graphics unit. External cache 137 also are included, and described in a separate section of the invention.

The local memory/message buffer 146 stores boot-up codes and monitor programs, as well as the message buffer. It is addressable by all the cluster control processors 144 in the group, along with the group controller 112.

Eight Megabytes of shared memory 134 are included for message sharing and storing the executable program and data for the program processors 126. It is directly accessible by the cluster control processor 144 and each program processor 126 over the shared memory bus 138. Shared memory 134 allows locked access for semaphore, test and set, and compare and swap operations. Shared memory 134 also allows burst fetches and burst reading.

One megabyte of dual port memory 136 is provided which is accessible by the DMA-I/O system 142, the program processors 126 and the cluster control processor 144. DMA and I/O transfers occur in parallel with access over the shared memory bus 138. The one Mbyte size enables storage of approximately 16 512×512 images.

The DMA 142 is controlled by the cluster controller 124 through a memory-mapped DMA control register. Controller 124 can load a target/source location and message length, then start the DMA transfer. Two DMA channels are included. One services outgoing images from the dual port memory 136 over serial port 122'. The other services incoming images from the serial port 122".

The shared memory bus controller 140 is a synchronous centralized arbiter of the shared memory bus. It uses an arbitration algorithm giving cycles in round robin fashion to units requests bus access. The shared memory bus 138 is a 160 megabyte/second bus.

An external cache memory 137 ties directly to the shared memory bus 138. in one embodiment 1 megabyte of direct mapped cache having a line size of 32 bytes is provided, matching the line size of the i860 program processors 126. Adaptable cache modes include, cache local, cache shared, and uncacheable. Normal cache modes include cache write through and write back. Cache write allocation forces a hit upon write. Line flushing, flush and invalidate, invalidation and labelling are used to control individual lines in cache.

In one embodiment a custom cache 137 is provided having a cache write generate mode which allows for validation of tags without reading the corresponding line from the shared memory (i.e., main memory). This reduces shared bus cycles improving the overall response of the system.

Distributed Memory

As discussed above, each cluster 114 includes shared memory 134 and dual port memory 136 controlled via DMA unit 142. In addition each i860 program processor 126 includes an 8k data cache, a 4k instruction cache and a 256 entry translation lookaside buffer. Control of the on-chip data cache is write back, 2 way set associative, with random replacement. Data cache replacement may be controlled in a supervisor mode. A register specifies the block to replace, or disables caching. The line size is 256 bits. For context switching and sharing of cached data, the on-chip cache is flushed to prevent aliasing.

Figure 18:
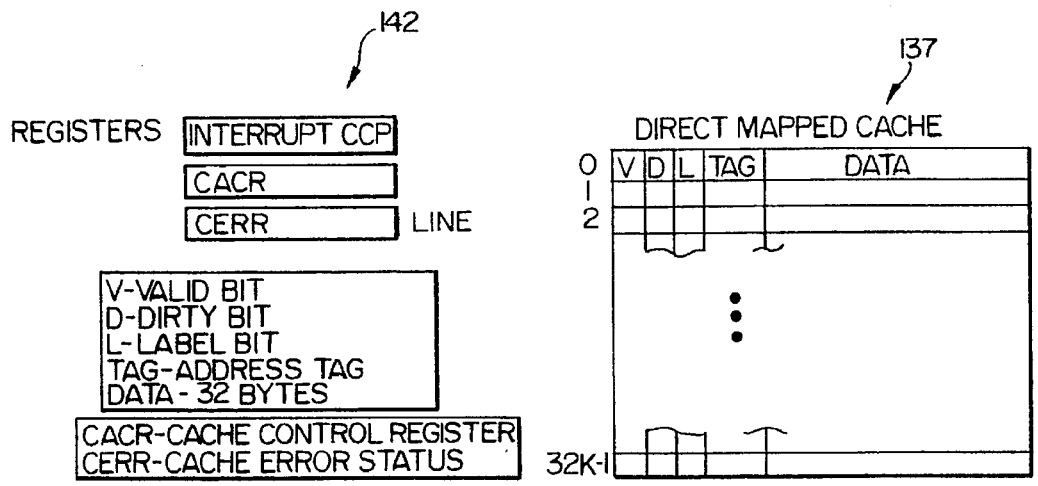
FIG. 18 is a cache configuration for the external cache of FIG. 17.

An external 1 megabyte cache 137 also is provided. The on-chip cache is primary cache while the external cache is a secondary cache. FIG. 18 shows the external cache 137 configuration. The external cache 137 is page and line controllable and is direct mapped with a line size of 256 bits. The page and line levels are used for controlling individual lines in cache 137 upon reads or writes by a processor 126. Many modes are supported with no wait state cache hit access. User addresses control line replacement and caching policies. Modes include write generate, write allocate and write around with an additional choice of write through, write back, noncacheable, or labelling. The most significant four bits of each address carry the information on whether a line is write around, allocate or generate. The read/write generate cache control validates cache tags without reading from shared memory.

Page modes include normal, read/write generate, allocate, noncacheable external cache, noncacheable on-chip cache, and write back versus write through modes. Page controls are determined by decoding address mode bits. In one embodiment there are thirteen page modes. The modes are activated for all read and write accesses to cache 137 when cache 137 is enabled. The mode bits are determined from the four high order address bits for the data requested. For the read generate mode, data is given if there is a hit. On a miss, a hit is forced on the external cache 137 and fixed data is given. The external cache 137 also fills the line with data from shared memory 134. If the data was valid and dirty before replacement, the dirty data is written to shared memory 134 before being overwritten.

The write generate mode forces a hit upon a write. In such mode, when the page tag is a hit the data is forced into cache 137 and the tag, valid and dirty bits are updated—regardless of whether the line tag was a hit. Write generate operates with either of write back or write through policies. For write through, data is written both to cache 137 and shared memory 134. For write back, the data is written only to external cache 137.

In a shared memory communication scheme as implemented by system 100, contention may result among I/O operations, read operations and write operations. Contention among I/O operations is removed by including a dual port I/O buffer 142. Also, because the external cache 137 is sufficiently large, read operation caching is near optimal performance. Write operations, however, affect performance in normal write through mode by causing contention problems. In the normal write back caching mode there is some improvement. However, to significantly reduce write contention problems, a cache mode referred to herein as "cache write generate" is created. Cache write generate operates with either write through or write back policies.

When performing a write operation with a system having cache memory, the data location for the write operation may be in cache or may not. If in cache, then in a write back mode, cache only updates its copy. In write through mode, cache updates both its copy and the shared memory copy. If the location is not in cache, then (i) shared memory can be directly updated, or (ii) a block of shared memory can be read into cache, with the write into cache being either write through or write back as discussed above. A third alternative according to an aspect of this invention is to create a space for the data in cache and update only that portion of cache. Specifically, rather than read a block of data into cache, a tag for a portion of a block is set and the data written only to a corresponding portion of the block. Thus, the written area is valid, but the remaining area encompassed by the tag is invalid. According to a specific embodiment, one valid/invalid status bit is used for each 4 bytes. To avoid cache incoherency problems for the invalid areas, specific areas of shared memory are specified as write before read areas at software development time.

The write first areas can be of any size, though in units of blocks/lines or pages. Any number of write before read area may be included. Pages are easier to manage as DMA controllers provide page management capability. According to a specific embodiment, write before read areas are implemented in page units. One bit of DMA status bits is allocated to signify whether the page is a write before read area. Foe block control, one bit per block is used to specify whether the block is a write before read area.

To maintain cache coherency, duplicate write generates to the same line are not permitted during a process. To avoid duplicate write generates, an additional bit is used. Such bit is reset at the start of each new process. Thus, for page units of write before read areas, K pages times N lines per page equals the number of bits implemented to avoid cache coherency problems.

Accordingly, a combined hardware software solution is used to implement write generate. On the software side, an application program defines the write before read areas. On the hardware side, the memory management unit (DMA), receives the write before read status for an area of memory and monitors write generates within a line of memory to avoid duplicate write generates. Advantages of this approach are reduced traffic on the shared memory bus 138 without any adverse impacts on other cache coherency solutions.

Cache write generate is the direct updating of cache tags on cache misses, forcing a hit on a line by validating the line without reading from memory. Thus, the part of the line written to is valid while the rest is invalid. To implement such feature effectively, portions of main memory are allocated as write before read areas. When only part of the line in cache is written to and the rest invalidated, performance does not suffer. The other portions will not be read unless preceded by a write operation. When the subsequent write comes along, a hit will occur. Cache write generate for write before read areas improves system 100 performance over write allocate mode. In particular, write generate reduces the number of bus cycles by making write misses more efficient.

Cache 137 Architecture: For comparison of write generate to other schemes the following terminology is used. A "cache line" in a single processor can be in any one of the following three modes: i) invalid, ii) valid, and iii) valid and dirty. In the first case, a cache line contains invalid data and should be updated if any access is made to that line. In the second case, the line contains valid data from the main memory, and in the last case the contents of line have been modified. If the write back policy is used then the last state is essential. For write through, the first two states are sufficient.

In the case of a shared memory multiprocessor system, a line can be in any of these five states: i) invalid, ii) valid, iii) valid shared, iv) exclusive, and v) exclusive dirty. The first two states are the same as the single processor. The third state identifies that data are being shared among multiple processors. A line is in exclusive state when a processor would like to modify a line and acquires permission to do so. The state exclusive is changed to state exclusive dirty when the data in line are actually modified.

In a multiprocessor system lines are set as being in a specific mode based on the information carried in a page table. A cache coherency protocol is used to inform all other processors to invalidate or update their contents if they are holding that line. Cache coherence is a major issue in the design of shared-memory multiprocessors because it is not easily scalable. Shared-memory multiprocessors have been successfully implemented with a small number of processors with single-bus, snooping cache schemes. Whenever a processor needs to write in a memory location, it informs all other processors and gets a copy of the current contents of the line containing that location. Other processors either update their data or invalidate the corresponding line in their caches. These policies are known as write broadcast and write invalidate, respectively.

Cache Write Generate: Suppose it is known that all memory locations in a line are going to be replaced. Then for write caching, the current data in that line, which are being transferred from main memory to cache 137, are not of any use. Therefore, write caching can be modified. A cache performing write caching, or write allocate, for a line need not read the actual contents of the main memory. Instead it generates that line in the cache by updating the line being written. This is cache write validation on a miss. If the write requires an existing line in cache to be replaced, the old line is replaced as in write allocate. If the replacement requires write back, the contents of the old cache line are written back. This cache operation is called cache write generate (CWG). A cache which directly writes to main memory upon a write cache miss can also be modified to CWG in the cache. CWG does not read the actual data, only coherency operations (broadcast, or directory update) take place at the memories above the cache level.

In a single processor system, a processor can CWG a line whenever it has this information. However, in a multiprocessor system, for cache coherency purposes it is important to inform the main memory system and other processors that a line is being used in write exclusive mode by the processor writing that line. A processor goes through an operation similar to write allocate, except the actual data are not read from the main memory to validate the cache line. This scheme has several advantages. First, it reduces the usage of write buffers and any indirect penalties, such as stalling of the CPU, clogging the bus, and delaying the cache. Second, it increases the number of hits on writes. This improves the total elapsed time. A higher hit ratio makes the cycles finish faster. This directly reduces the bus (or network) contention and therefore helps improve the performance of multiprocessor systems. Because of the increased bandwidth available, one can increase the number of processors in a shared bus system.

EXAMPLE 1

Consider the following program of matrix multiplication and differencing.

1. R=P*Q
2. U=S*T
3. V=R−U

Here P, Q, R, S, T, U and V are two dimensional matrices. Suppose the secondary cache is large enough to hold all the data. If a write caching or write allocate policy is used, then matrices R, U and V will be read from the memory before they are written. This wastes of bus operations and processor time. Of course, in the third step, the processor will be able to use the data from the cache for matrices R and U. On the other hand, if cache is not going to write allocate for R, U and V, then in the first two steps, individual elements of R and U will be written in the main memory as they are computed (since they will miss in cache). Afterwards, in step 3, they will be read back as misses in cache. In either case, bus cycles are wasted. If the cache is not large enough R and U can be generated, saving time and bus cycles as replacements use the full bus width. Finally, if the result of interest is only V, then it is waste of time to read and write any data in R and U from/to main memory. These are temporary locations which are allocated and deallocated during the computation. All such dynamically allocated memory can be used by CWG. The effect of write generate is the same as using part of the cache as a local memory without size limitations.

Identification of Write Generate Variables: Examples of data which will benefit from CWG are any data computed by the processor or explicitly initialized by the processor. These variables are dynamically allocated memories, stack segments static memory segments, and temporary buffers. All of these are easy to identify either through explicit declaration or by the compiler. In the above example, a user can specify R, U and V as generate areas by explicit declaration. Alternatively, the compiler identifies R, U and V as outputs of the program.

Specification of Write Generate Variables: Once identified, the variables are marked as generate. The memory area is called a generate area, or block. When the process has finished using it becomes generated. There are two possible transitions from generate, one to spawned, and one to killed. These transitions happen when the process explicitly flushes or invalidates the data. For the cache to take advantage of generate areas it performs CWG when writes are made to those areas. Note that a generate area may or may not be cache write generated at any given time.

The marking control can be exercised at several levels. For simplicity in discussion, a cache line is the granularity level of control. In other embodiments control may be at the word level. Page level control is more amenable. This is because most microprocessors include a memory management unit (MMU) on-chip. Page table entries (FTE) and the translation look aside buffer (TLB) carry the relevant page control information. An additional bit in the PTE and the TLB specifies if the data in a page are generated. This means all output areas should be allocated in such a way that either a page is generated or it is not. While executing a program, whenever data in a generate page are written, the page entry is available in the translation look aside buffer. The additional bit specifying generate is transferred to the cache memory. If the write is a miss, the cache can use this information to CWG. That is, it forces a hit and updates the tag for that line. Any dirty line occupying that cache area is written back in the memory. If it is a hit then it is business as usual.

Cache write generate, CWG, can be combined with a write through policy if data written by one processor is used by other processors through shared memory. An explicit control mechanism must still be used to make the area spawned. For write back caching data are flushed to the main memory to spawn them. If data is used for scratch buffers it may be killed by directly invalidating the cache lines.

In another embodiment, the generate mode uses a directory-based cache coherency scheme. By maintaining cache coherency in a centralized directory, a memory management processor maintains the status of each cache block. In this case the directory is initialized for each line so that it can be generated or not. When an exclusive request is made for generate areas, the directory informs the requesting processor to validate the cache line and marks it CWG. For subsequent accesses the line is treated as a normal cache line. The main memory data are not transferred when it is marked as CWG saving main memory cycles and latency to satisfy the exclusive request.

Special attention is paid to data partitioning in multiprocessor systems and multi-tasking systems. Processors are given groups of cache lines as individual line boundaries which are not crossed to maintain data coherency. In a directory based scheme, the control is easier as the generation control remains with the directory. All schemes may control at the page level, and if processors are not allowed to share pages then line boundaries are preserved.

Example of Processing Using Generate

EXAMPLE 2

Figures 19, 20, 21:
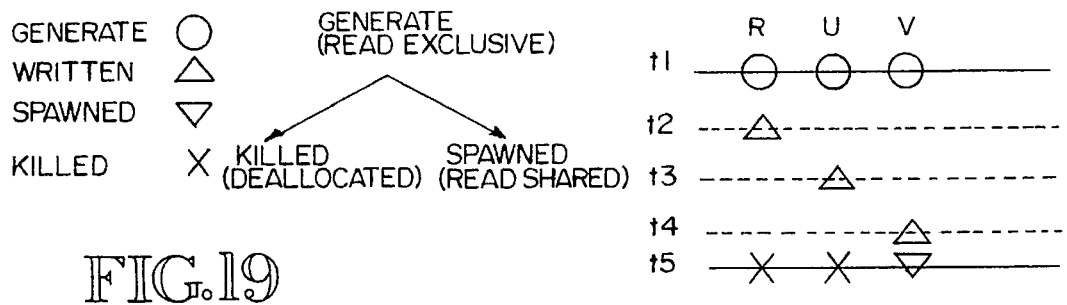
FIG. 19 is a diagram of generate memory block states for the external cache of FIG. 17.
FIG. 20 is a diagram illustrating an example of multiple validation, start state for the cache of FIG. 17.
FIG. 21 is a diagram illustrating an example of multiple validation problem.

To demonstrate, consider the example shown in FIG. 19. A process starts at time $t_1$ and is given memory blocks to generate, marked R, U, and V marked with a circle. These blocks are actually written at time $t_2$, $t_3$, and $t_4$ marked by a triangle. At time $t_5$ some data are killed as marked by an X and some are spawned as marked by an upside down triangle. Results intended as input to another process would be spawned areas, where killed areas would be unallocated memory. Within a process, memory may be generated, spawned, and killed, similar to malloc() calls for C, but the greatest performance advantage is when the generate areas are embedded as the process is started to be used at its leisure. The killed areas are invalidated by the process. The directory controller notifies, or even starts processes using the spawned areas.

Management of Generate: Generate is enabled in a cache line if the data hasn't been previously written. Implementation of such a scheme includes dynamical monitoring of memory usage to ensure that generate does not create multiple validated lines. The danger is of validating a line multiple times for the same address. Upon each validation previously written data may be lost as shown in the following example.

Assume that the generate control is provided at the page level and CWG is done at the line cache level. For simplicity assume that page size is 4 lines and the cache has 32 locations with a line size of 4. The memory management unit carries the generate information for different pages. A "1" means the page's lines are generate and a "0" means they are not. As shown in FIGS. 20 and 21, assume that the cache operations occur in the following sequence. MM denotes main memory, CM denotes cache memory, and . denotes don't care data. First action (write $R_0$ to location 7) causes a cache write miss. However, the cache is set to generate for that line (page 0) and the CWG forces the hit in the cache. No data are read from the main memory. Next, a read to location 39 mapping to cache line 1 is a miss, so a replacement takes place for line 1. Note that location 39 is in page 2 which is not generate. After this we write $R_1$ to location 6. This again maps to line 1 which is generate, and it is CWG'ed. Now, if a read is made to address 7, a read in the same line, the cache supplies incorrect data to processor causing a problem. This happens because the line containing address 7 created multiple copies, and the one in main memory is lost. A following replacement of CM 4 has MM4 over written and $R_0$ would be lost.

Below three different solutions are presented that avoid the coherency problem discussed above, and provide differing amounts of overhead and performance. To ensure that generate does not create multiple copies of data some additional cache control is provided. Control is separated into memory control and cache control. The memory control was described previously. The cache control is described in this section.

Bit per Cache Line: One simple solution to avoid consistency problems is to provide an extra control bit for each cache line indicating whether that line has been CWG'ed. The generate area may or may not require CWG and in some cases such as that shown in Example 3 it should not be done. If a line was used for a write validate on a miss (CWG) we say it has CWG'ed a line of the generate area. We may store the state of CWG in a single bit. Note that the memory area is not generated until the area is explicitly flushed or invalidated as completed. Areas are generated by spawning or killing them, and the process of cache write generate is simply a memory operation on a generate area, not generating the area. Initially this bit is set to "0". If the page control bit says that the line is generate and the line has not been CWG'ed earlier, then the line is validated and the bit is set to "1". Once set, the bit remains "1" until the cache line is invalidated. A line that is labeled CWG'ed is not CWG'ed a second time. If a line is replaced by another line, the bit remains set. At the time of context switch, the main PTE and TLB entry are modified so that the page loses the capability of further CWG. This eliminates the possibility of multiple validations. Alternatively, one saves the status of each line for context switches which is expensive. In the case of multi-way set associative cache memory, additional bits may be used at each set address to CWG each line in the set. For example, a 4-way set associative cache may CWG 4 successive lines in a given set, but any additional misses to that set will clear the CWG capability of the set until restored by the process generating (spawning or killing) the memory area. In multi-way set associative caches, if a line is to be replaced, it is one which has not been CWG until no such line is available in the set.

Figure 22:
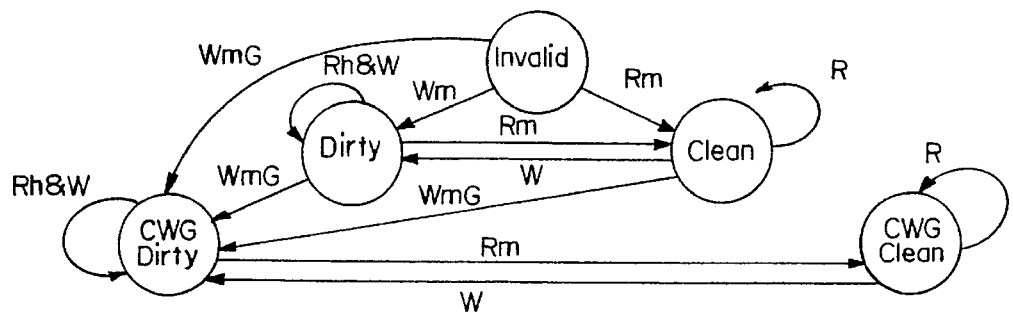
FIG. 22 is a flow graph of bit per cache line control of the cache of FIG. 17.

The bit per cache line scheme avoids multiple validations. See the state diagram of FIG. 22. In an earlier example, when (write 7) is performed, the line is validated, the tag value is set to location 7, and the CWG bit is set to 1. When (read 39) is performed, the tag is set to correspond to location 39 but CWG bit remains set. When (write 6) is performed, the line is not CWG'ed again but is treated as normal read/write operation. The data is filled from the memory, and no data is lost. Shown in FIG. 22 there is an additional line state CWG dirty which can only be reached once, and to restore CWG ability the line is invalidated or flushed and invalidated.

The advantages of this scheme are that it is simple and it has low overhead. It requires one extra bit per page table entry, and one bit per cache set. The disadvantage of this scheme is that if multiple lines map to the same set in the cache, then only one will be CWG'ed. If the generate area is larger than the cache, or pages which are generate are scattered in memory, then this occurs frequently. This choice is beneficial in a system with large direct mapped caches and cache conscious compilers.

Figure 23:
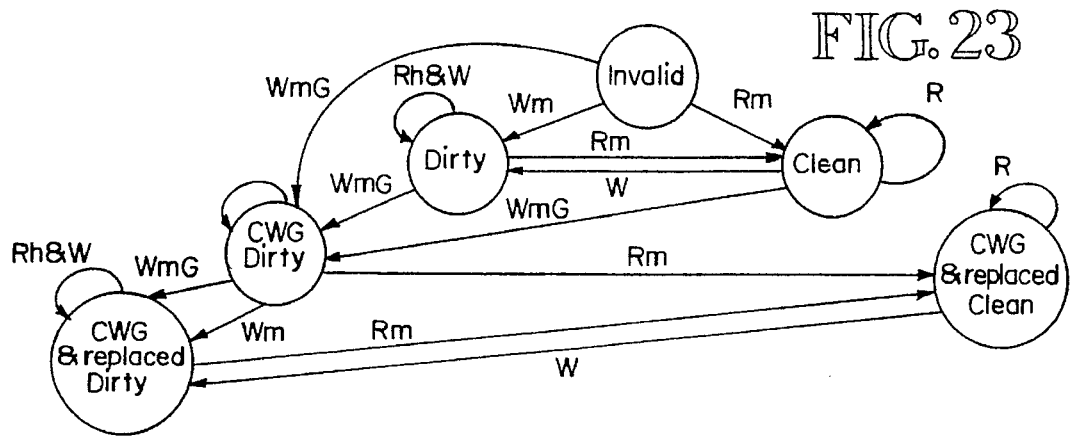
FIG. 23 is a flow graph of the two bits per cache line control of the cache of FIG. 17.

Two-Bits per Cache Line: To improve generate capability and overcome some restrictions of the first scheme, a cache line may have two control bits instead of one. These two bits are used to encode the following three states: not CWG (00), CWG (01), and CWG and replaced (10). See the cache state transitions diagram in FIG. 23. Initially each line is in not CWG state. When it is CWG for the first time, i.e., when a processor writes in a generate location indicated by the TLB entry, the line state is changed to CWG. The tag is now initialized to correspond to the line just validated. Now, if a later read miss request maps on the same line, the line is replaced by the new line and the line state is changed to CWG and replaced.

If the second request mapping on this line is from another generate page then a second CWG could be carried out without causing any inconsistency. This is because, state 01 indicates that the current line has been CWG once and has not been replaced. Therefore, the first CWG could not have been from the second page. Notice that this is extended because the third CWG request to this line could be from the first page again as was the case in Example 3.

It is possible that these three states could be combined with existing state control so the actual overhead may be less than two bits (one bit) per line. This requires two control bits per cache set but doubles the generate area and thus may be more useful for smaller caches. For large caches, these two schemes will perform equally well with appropriate data mapping. The action at the time of context switch is exactly same in this scheme as it was in the previous case.

Figure 24:
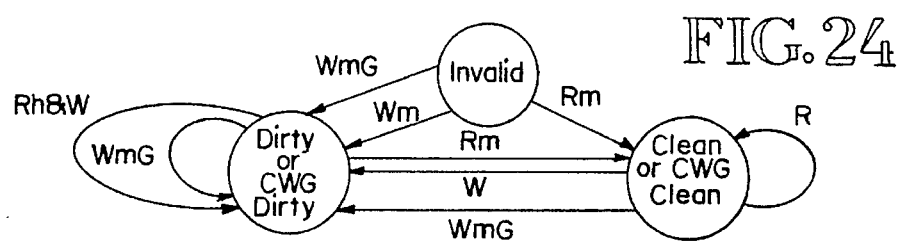
FIG. 24 is a flow graph of the translation lookaside buffer control for the cache of FIG. 17.
Figure 25:
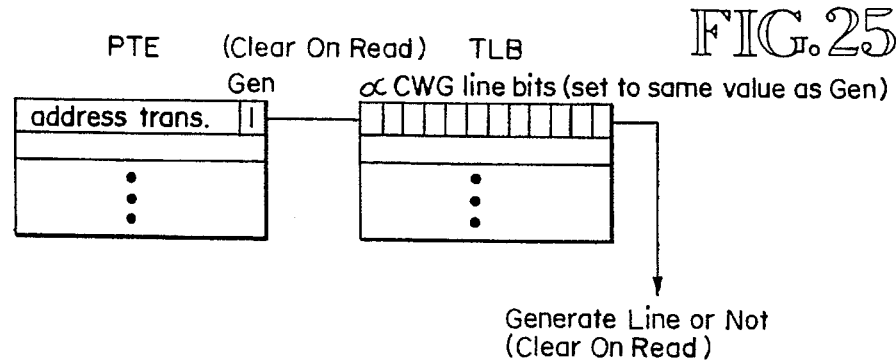
FIG. 25 is a diagram illustrating TLB cache write generate bit storage and control for the cache of FIG. 17.

TLB Control: To fully utilize generate, a third scheme keeps track of lines in each page which have been CWG'ed (see FIGS. 24 and 25). This is done by allocating one bit per line in each generate page to keep track of lines which have been CWG'ed or not. As in the earlier schemes, one bit is included in the page table to specify whether that page is generate. To describe the overhead, suppose alpha is the number of lines per page. For example, given a 4 K byte page size and 32 byte line size, there are 128 lines/page. When the PTE is fetched in the TLB, alpha bits are associated with that page as shown in FIG. 25. These bits are set to generate (set to 1) if the page is generate, and the generate bit in the page table is reset to not generate. A line is CWG'ed by the cache if the TLB entry for that line in that page is generate. After a CWG, the bit in TLB is reset to 0. Thus no CWG is possible the second time around.

Using this scheme, multiple generate lines mapping to the same cache lines can all be CWG'ed. If a context switch takes place, remaining lines in a page can be CWG'ed later only if their PTE remains in the TLB. If TLB entry is removed from the TLB for any reason, no further CWG in that page are possible because the PTE has already been reset. In this way no data is lost through multiple CWG's of the same lines. This scheme has the further advantage that a page can be set to generate and spawned or killed several times by simply modifying the PTE. Thus any pages used as scratched areas can be repeatedly CWG'ed without intermediate flushes or invalidates as required in the first two solutions.

The disadvantage of this scheme is that the TLB is modified. The overhead in this scheme is, however, of the same order as the other schemes. One needs to provide alpha bits per TLB entry. Typically TLBs have 128 locations and alpha=128. The number of additional bits required is epsilon times alpha. For 128 locations this is 128 times 128 which is 16,384. For a 512 K byte cache memory with 32 bytes/line and 1 bit per cache line scheme, 16,384 extra bits are used. So the overheads are comparable and TLB control is more efficient than either bit per cache line control or two bits per cache line control.

Read Generate: Similar to the case of write generate, suppose it is known that processor is reading data just to initialize its cache tags and not going to use them. Then fake data can be supplied to the processor, again without actual reading from main memory. Of course, cache coherency protocol should be maintained.

This can happen in cases where the processor cache is already designed and the system designer using that processor has no control over that design. However, in specific cases, it is useful to cache the output areas in the on-chip cache to improve the overall performance. In this case, the programmer may program in such a way that the output variables are read before writing. Since, the secondary cache can be informed of this action, the secondary cache can generate this data and supply some fixed data to processor. This can also be used for initialization of the data to a fixed value (for example 0) which is done by the operating system or programmer in many instances. This is read generate.

Figure 26:
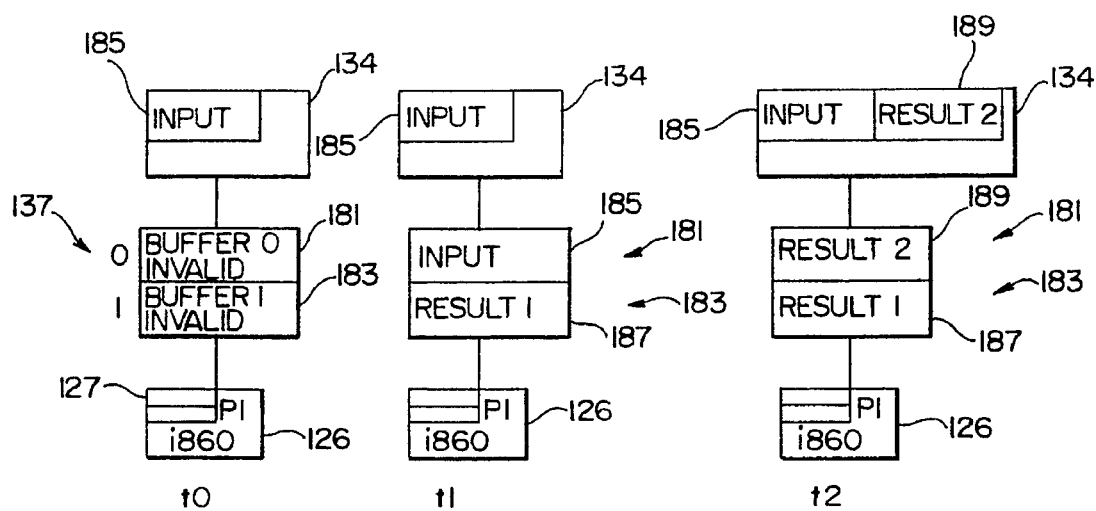
FIG. 26 is a diagram of a cache control example according to an embodiment of this invention.

FIG. 26 shows a cache 137 control example according to a preferred embodiment. For processing an image using two buffers for storage, the buffers 181, 183 hold images of 256×256 pixels. FIG. 26 shows the cache 137 and shared memory. 134 at three instances in time. At time t0, the input image 185 is in shared memory 134. At time t1, processor 126 reads the image 185 with the cache 137 in normal page mode filling the on-chip cache 127 and external cache 137. Result 1 187 is read in read/write generate mode to the on-chip cache 127. The read operation does not include access to shared memory, but latches in fixed data to validate the processor cache tags. When writing result 1 187, the external cache 137 validates the writes, and fills the tags and data of the line without going to shared memory 134. Future reads of the data in the validated sections of result 1 187 thus retrieve valid data.

At time t2 a second image processing operation occurs in which a different page mode is used for result 2 189—a read generate write through mode. Read generate occurs to cache fixed data on the processor 126. The values in result 2 189 are written to shared memory 134 as they are written in external cache. Processing is complete. Result 2 189 is a final image now stored in shared memory 134, except for the data held on processor 126. The processor 126 flushes any additional data in its data cache so it appears in shared memory 134. Only the input image 185 is read from shared memory 134 and only result 2 189 written to shared memory 134.

Image Multiprocessor Software Architecture

Figure 27:
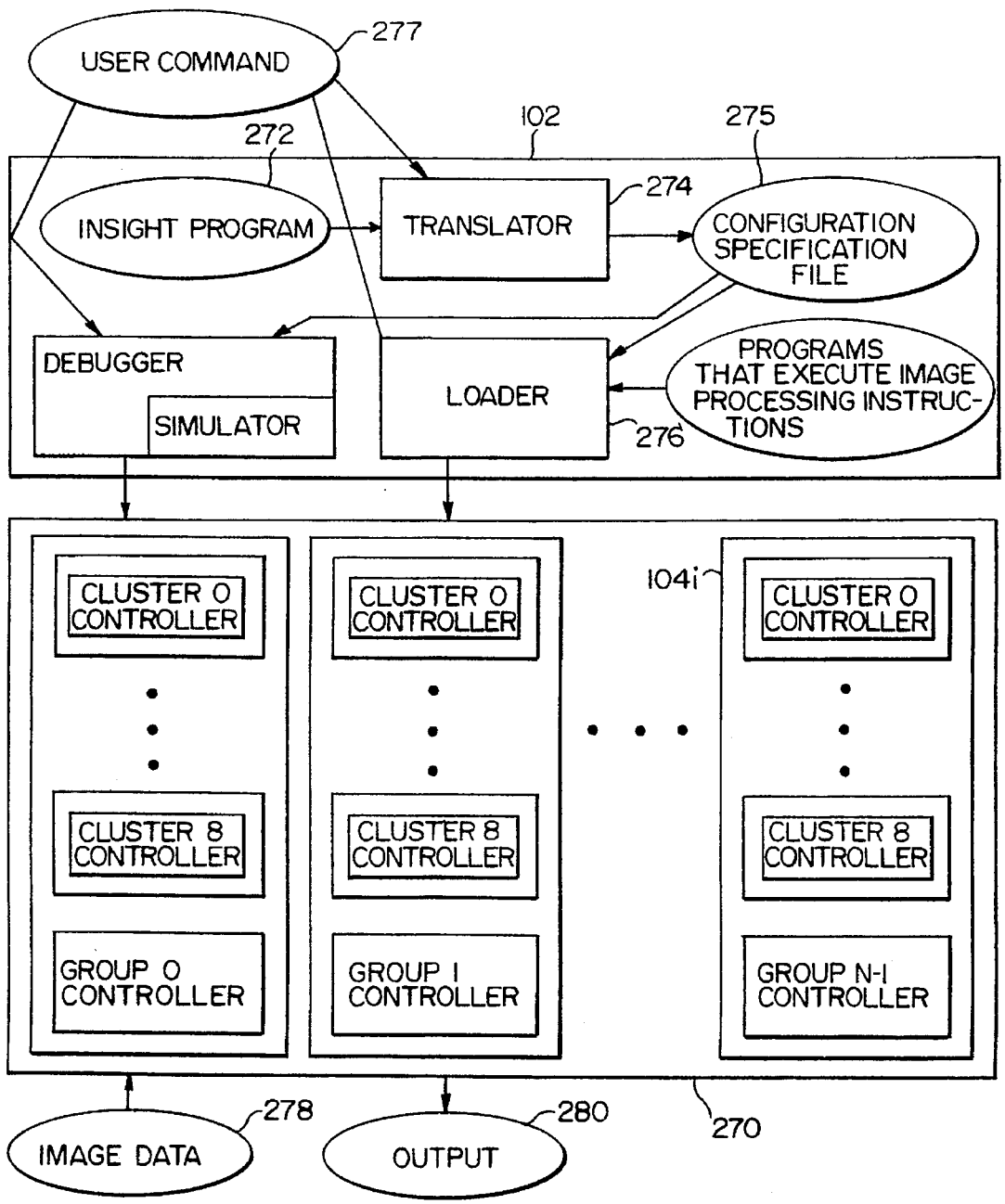
FIG. 27 is a block diagram of the software architecture for the system of FIG. 3.

FIG. 27 shows a block diagram of the software architecture for multiprocessor system 100. From a software perspective, the system 100 includes the host computer 102 and a computation network 270. The network 270 includes the processor groups 104 connected through the reconfigurable connection network (RCN) 106.

A user interacts with the system 100 through the host computer 102. In one embodiment, a user prepares a program 272 in the INSIGHT language which is partitioned by translator 274. The translator 274 generates configuration specification files 275. Loader 276 accesses such files 275 to load application sub-tasks among the multiple processor groups 104. The sub-tasks are executed at the program processor 126 level. A program processor 126 receives and processes image data 278 then generates output data 280 according to their assigned sub-tasks.

The system 100 software includes: (1) translator 274, loader 276, and debugger 282 which run on the host 102; (2) message processing and control modules which run in the group controllers 112 and cluster controllers 124; and (3) interrupt handlers which run on the program processors 126.

The system 100 includes three states: initialize, load and run. At initialization the host 102, group controller 112, cluster controller 124 and program processors 126 execute power on self tests. The group controller 112 boots from the host over Ethernet 110 then waits for an indication that all cluster controllers in its group 104 are present and alive. The group controller distributes data files from the host to the cluster controllers 124 and program processors 126.

In the load state, object code and schedule files for executing INSIGHT programs are transferred from the host 102 to shared memory 134 within each cluster 114. Specifically, the group controller 112 requests a load map and schedule map from the host 102. The group controller 112 then sends via VME bus 120 the cluster portion of the schedule map and a set of files containing processor 126 object code routines and constants with specified shared memory locations for an application program. The program processors 126 remain halted during the load state until certain service routines are loaded into shared memory 134. Each processor 126 then is vectored to its main executive scheduling loop.

In the run state, the system 100 processes images. Images enter through the decompressor interface 118 for distribution among program processors 126. Analysis then is returned to the host 102. Fault management and debugging operations also occur during the run state. During run, the group controller 112 acts primarily in a supervisory capacity, while the cluster controllers 124 schedule and initiate image processing sub-tasks and support debugging operations.

Host Software

A user writes an INSIGHT program 272 defining application tasks and the number of processors used for each task. Translator 274 compiles the program 272 to generate a configuration specification file 275. Each configuration specification file defines a set of generic processors and the jobs partitioned among them. Each file also defines a task class. System 100 executes multiple instances of a single task class or single instances of multiple task classes.

To load and execute a task, the user issues a task request command 277 to the host 102. A task request indicates which task classes should be executed and the external data sources needed. The loader 276 retrieves the configuration specification file(s) produced by the translator determining whether the system is configured to execute the task assignment. If capable, then loader 276 maps logical processor names in system 100 to the set of generic processors defined by the translator 274. Mapping may be many logical processor per generic processor (i.e., redundant computations) or one to one.

Throughout system 100 logical and physical mapping is decided hierarchically. The host decides the mapping between logical groups and physical groups 104. Group controllers 112 decide the mapping between logic clusters and physical clusters 114. At run time, cluster controllers 124 decide the mapping between logical processors and physical processors 126.

Each logical processor inherits the assignments from its corresponding generic processor and thus has a list of jobs to execute. Each job has the following attributes: program identification, input arcs, output arcs, and constant parameters. Each job has a unique job id assigned by the loader. Each arc has a unique arc id assigned by the loader 276. Buffers are assigned to each arc. The translator decides the number of buffers to assign to an arc. The cluster controller assigns actual memory addresses to each buffer.

The loader 276 packs all schedule information needed by a logical cluster into a scheduling file and all constant parameters needed by jobs executing within that cluster into a constant file. At run time, the cluster controller transfers task scheduling information from the cluster controller to the program processor via a task control block. The task control block contains the identification tag, starting address of the program to be executed, and pointers to the buffers to be used for input and output. Based on the job assignments, the loader 276 determines which programs are loaded to a given cluster and assigns memory space in shared memory to each program. Then, the loader creates a transfer request file for each group 104. Each transfer request file has a list of file transfer requests.

After files are generated, the host 102 sends loading request messages to each group 104 via Ethernet 110. A first part of the request specifies the action is "load". The second part is the full path name for the transfer request file. Each group controller 112 receives its transfer request file and writes it to a VME buffer for the destination cluster 114.

When all files specified in the transfer request have been moved to the clusters, the group controller 112 sends a file transfer complete message to each cluster 114 in the group 104. Thereafter, the cluster controller 124 sends a ready-to-work message to the group controller 112. When each cluster provides the ready-to-work signal, then the group sends a ready-to-work message to the host 102. The host then synchronizes the external data sources and system 100 begins execution.

System 100 implements a variety of control mechanisms. At run time, a cluster controller 124 dispatches a job to an idle program processor 126 by interrupting the processor to indicate a task control block is ready for reading. The processor 126 then executes the job. When the program processor 126 completes the job, it creates a task completion record and interrupts the cluster controller 124 to report the results. After receiving the interrupt, the cluster controller reads the completion record, When a busy processor completes a task, it checks its task control block area to determine if there is another task awaiting execution.

The host modules are now described in more detail.

Figure 28:
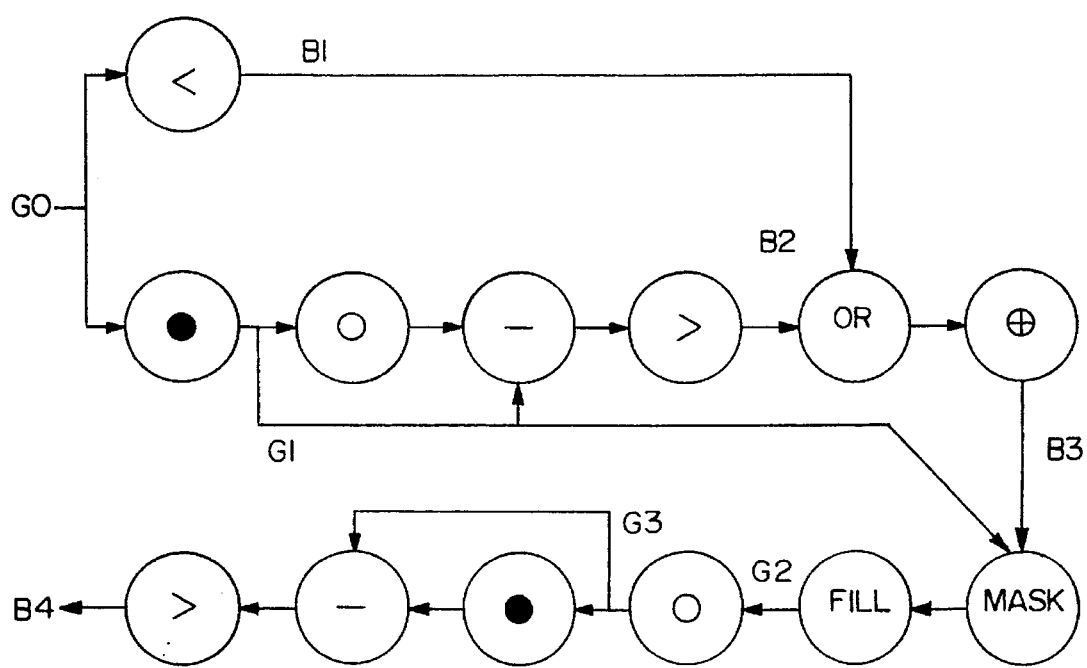
FIG. 28 is a program graph for a sample program written in the INSIGHT program language.

INSIGHT program: Programs in one embodiment are written in the INSIGHT language which is a relational data flow language. The INSIGHT language expresses relationships, rather than commands. The user gives relationships between sequences of images in terms of input images, output images and user-declared intermediate images, scalars and other constructs. The order in which the relationships are stored does not effect the results. Instead the relationships present a graph structure that defines the flow of data through system 100. This allows user to specify the generic network through which the data flow traverses, but not how each operation is partitioned between physical processors 126. FIG. 28 is a program graph for an example program listed below:

---

Sample Program

--- function Detect
    (interger array[256,256] G0;)
    (binary array[256,256] B1,B2,B3;
where
    declare
        interger array[256,256]G1,G2,G3;
        binary array[256,256]B1,B2,B3;
        interger constant T1=195,T2=20,T3=25;
        interger constant W1=5,W2=15,W3=42,W4=126,W5=3;
    relations
        B1=G0<T1;
        G1=G0 closed by box(W1,W1);
        B2=(G1-(G1 openedby box (W2,W2)))>T2;
        B3=(B1 or B2) dilatedby box(W5,W5);
        G2=fill(G1 maskedby B3);
        G3=G2 openedby box (W3,W3);
        B4=(G3-(G3 closedby box(W4,W4)))>T3;
endwhere

---

The input to the program is a 256×256 gray scale image G0, and the output is a 256×256 binary image B4. Intermediate gray scale images G1, G2, G3 and intermediate binary images B1, B2, and B3 are also produced during execution of the program. The first relation says that gray scale image G0 is to thresholded using threshold T1 (a constant), and the results is to become binary image B1. The second relation says that G0 is also to be the input to a morphological closing operation with a structuring element that is a box (rectangle) of dimension 5×5, with the result becoming gray scale image G1. The third relation specifies the production of another binary image B2 that is the result of performing an opening in G1, subtracting the opening from G1 itself and thresholding the result of the subtraction.

Translator 274: Translator 274 runs on the host computer 102 converting a process described in a high level computer language (i.e., INSIGHT) into control/object code run on the computation network 270. To do so, the translator 274 parses the process, generates a network of data dependencies between individual operations and mapping the resulting computational flow graph onto the network 270. Complex operations are decomposed into two or more equivalent sub-operations.

Figure 29:
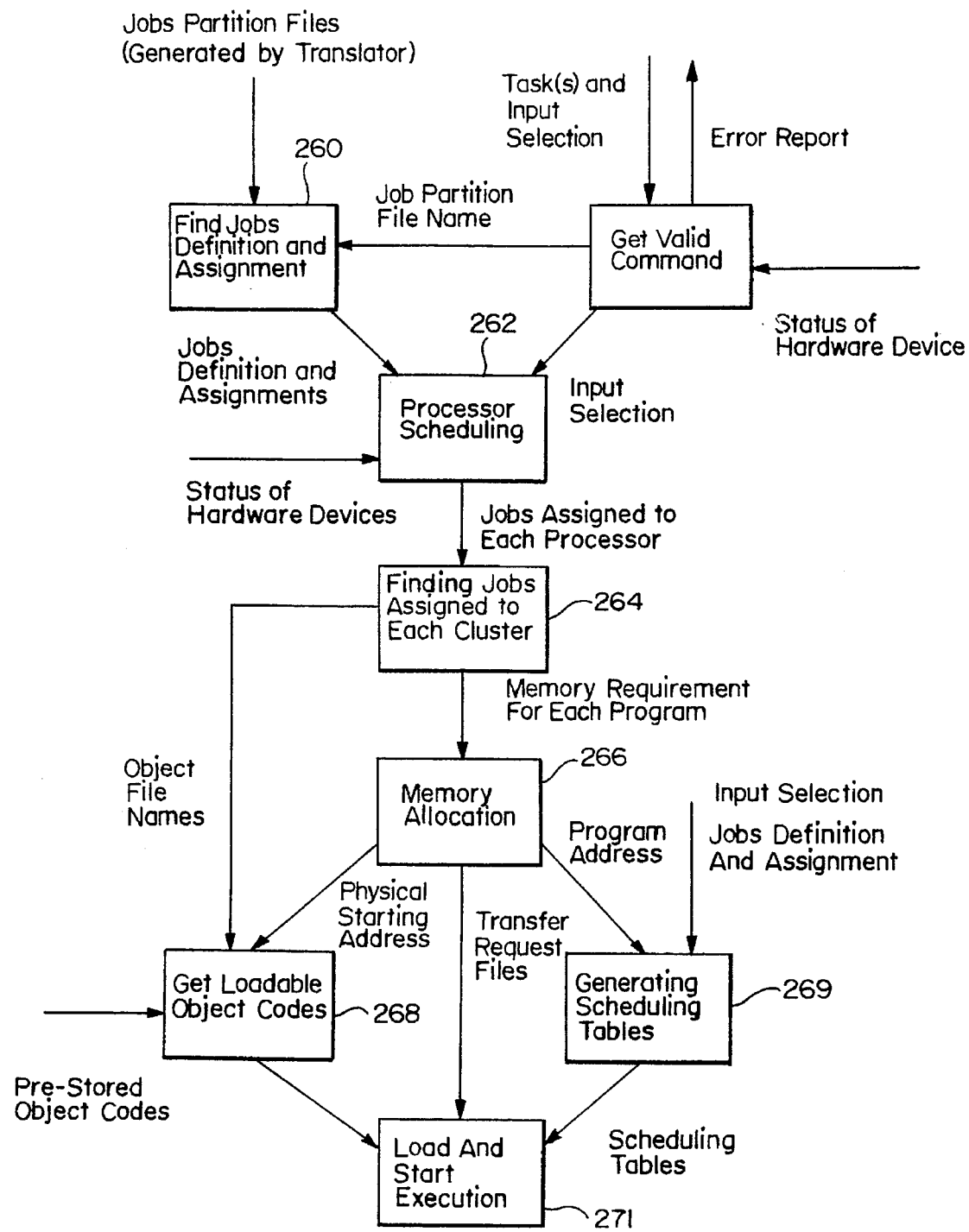
FIG. 29 is a data flow diagram for the loader module embedded in the host computer of FIGS. 3 and 18.

Loader 276: Referring to FIG. 29, a data flow between the loader 276 and other software modules is shown. The loader receives configuration specification files 275 (i.e., job partition files, tasks, and assignment files) from the translator, along with prestored object codes from host memory, and hardware status from hardware devices. From the partition files job definition and assignments are located at routine 281 and scheduled at routine 284. Jobs assigned to each cluster then are assigned at routine 284 based on the scheduling information and hardware status. Memory then is allocated by routine 286, resulting in loadable object code 288 and scheduling tables 290. Then the tasks are loaded to the processor groups and execution begins 292.

Debugger 278: Debugger 278 runs on the host 102 aiding users in verifying that system 100 is operating as intended and in finding errors in the processor interactions and message passing. Debugger 278 is partitioned into two main processes that communicate by message passing: (1) a first process executed by the host 102; and (2) a second process distributed over the computation network 270. The first process provides the front end interface and management of debugger resources. (i.e., hardware configuration, program addresses, object files, and symbol tables. The second process is supported by interrupt service routines of the program processors and device routines in the cluster controllers.

Communication: The host sends messages to a group controller via Ethernet 110 for: initialization, load an application, reboot, halt, clear, or debug a message request. The group controller 112 sends messages to the host via Ethernet, including: status, error, application answer, debug report messages and unclaimed messages. The host sends messages to the cluster controller 124 via the group controller 112 to clear, reboot or debug a message request. A cluster controller 124 sends messages to the host 102 to report an error, debug message and unclaimed messages.

Group Controller and Cluster Controller Software

In one embodiment communication among elements within a group 104 comply with the Programmable Interprocessor Communications Library protocols set by Oak Ridge National Laboratories. The underlying system environment of the group 104 is SUN O/S, a derivative of the UNIX operating system. The communication and control software runs as a set of processes under the SUN O/S kernel.

The group controller 112 is a SPARCengine running SUN O/S. Object software includes the cluster controller operating system consisting of those processes needed for providing interprocessor communications and resource management among program processors 126. Message passing protocols are constructed with an intermediate abstract data structure which passes parameters between processors through shared memory 134.

The basic message architecture includes a definition for a task control. Typically, messages start, stop or restart a task queue. The task control mechanism is separate from the message system enabling scheduling information to be passed asynchronously without interrupting processors 126. The cluster controller 124 transfers task scheduling information from the cluster 114 to a processor 126 via a task control block (TCB). The TCB contains an identification flag, starting address of the subprogram to be executed and pointers to buffers used for input and output. If the task queue is not empty and the processor is not idle, the TCB is placed on the queue through a semaphore system. A processors 126 maintains the pointer to its next TCB. The cluster controller 124 maintains a pointer to a next free TCB. Upon completion of each task, processor 126 communicates with the cluster controller 124 via the message system. The completion message points to a task completion record. The completion record includes a job identifier and status information. The cluster controller 124 sends messages to a processor 126 via interrupt when: (i) the processor 126 is idle and there is a task scheduled, and (ii) a system transition event occurs requiring immediate action, such as an error condition or a debug message. The cluster controller 124 also forwards messages between processors 126 and the host 162.

Communication and scheduler software resides on the group control processor 112 and cluster control processor 144. These routines control how messages are passed between tasks and processors, and which tasks are executed. A communication system controls message passing, while a scheduler system controls the order of task execution. The communication system includes: tasks that perform specific functions, a collection of user-callable routines (i.e., kernel routines) and low level routines called by the tasks and kernel routines. A message is sent from one processor 126 to another processor 126 by storing message data and a header into a transmission buffer. The transmission buffer becomes the other processor's receive buffer. The receiving processor is notified that a message exists via interrupt. Data is transferred to a program processor 126 through shared memory 134. Semaphores and counters are implemented in software and memory locks in hardware to assure error free transfers.

The group controller 112 and cluster controller 124 send messages to the program processors 126 to indicate: resume processing, reboot, halt, clear, debug, get status and load a task control block list. A program processor 126 sends messages to the cluster controller to indicate: task completed, run completed, status, on, or debug watch point reached.

For scheduling tasks, the cluster control processor 144 executes routines to get an input image buffer, to find a job to have executed, to assign a task to a program processor 126 and to create a buffer for data to be output to processors 126 in another cluster. The cluster controller builds a queue of task control blocks for assignment to processors 126.

Message Transmission: Message transmission is the transferring of data from the memory of one processor 126 to the memory of another processor 126. In the exchange between a cluster controller 124 and a program processor 126 or from a cluster controller 124 to its group controller 112, there is a change in ownership of the memory space containing the message. Each group controller can communicate directly with the host 102 or any of its cluster controllers 124. The cluster controller 124 is capable of directly communicating with its group controller 112 or its program processors 126. If any processor 126 sends a message to another processor 126 that it is not directly connected with, then the message is automatically forwarded through other groups until it arrives at its destination processor.

A transmission request has inputs including a destination node address, a buffer address containing the data to be sent, and the length of the data. If the message is a broadcast message then the physical node address is a number of physical processor id's. Once the message buffer is input to the communication system, the requesting application sub-task may not access the message buffer, until the buffer is released by the communication system. A transmission request has outputs including a buffer address, message size and acceptance status returned to the requesting application sub-task.

Message to memory message transmission is synchronized to ensure the receiving processor 126 has read the message. The sending processor copies the data into shared memory 134 using the message number contained in the message header. When the receiving processor completes reading of the message, it places the message number contained in the message header into a buffer status buffer that both the receiving and sending processors can access. When the send processor desires to send another message it first checks the message number of the message currently in the shared buffer. If the message number is the same, then the new message can be sent. If different, it must wait until the message number in the message buffer is the same as the number in the buffer status buffer.

The cluster controller 124 can directly communicate with its group controller 112 and its four program processors 126. The cluster controller 124 sends messages to its group controller 112 by copying the message into VME memory, then sending a signal to the group controller 112 informing it of the message. The cluster controller 124 sends messages to a program processor 126 in a similar manner. Each program processor 126 has an area of memory it checks for messages each time it is interrupted. Such messages are read before TCBs are read enabling the cluster controller to queue tasks.

The group controller directly communicates with all of its cluster controllers 124 and the host 102. In addition cross switching enables connection to other group controllers 112, however, such communication is managed through the host 102.

Message Reception: Message reception is the complement of message transmission and is the copying of data from the sending processor to the local processor. For memory to memory message reception, reception is invoked through an interrupt from the sending processor. The interrupt vectors the reception process, which is responsible for copying the data into local memory. When copying of the message is complete, the message number is written into the buffer status buffer.

Message reception inputs include the receive buffer from which the message is copied and the free message buffer queue which provides the address of where to copy the message. The output is the buffer containing the message.

Fault Tolerant Network Synchronization

Each permutation mapped onto the system 100 is implemented through an enhanced hypercube formed by cross-switched links of the reconfigurable connection network 106, including the crossbar switches 116 of each processor group 104. Setting each crossbar's connections is synchronized according to an embodiment of the fault tolerant synchronization method of this invention.

In non-fault tolerant hypercube synchronization methods nodes wait until all other nodes have finished their tasks before starting a new cycle. In systems where faults are tolerated, nodes can not wait until they are certain all other nodes have finished. This is because a faulty node may not send a completion message, thereby stalling the system.

In a fault tolerant method in which nodes can not wait for messages from every other node before proceeding to the next cycle, the fastest nodes can not distinguish between the slowest non-faulty node and a faulty node. However, it still is important that the slowest nodes finish their tasks before the next cycle begins. According to an aspect of this invention, the fast nodes are able to force a slow node to start the next cycle early so that the system continues in synchronous operation, while tolerating faults. To implement such aspect, a communication cycle time is defined having a period in which all nodes can finish their tasks. Synchronization is triggered at the end of each communication cycle, rather than at the end of a node's processing of a task.

Figure 30:
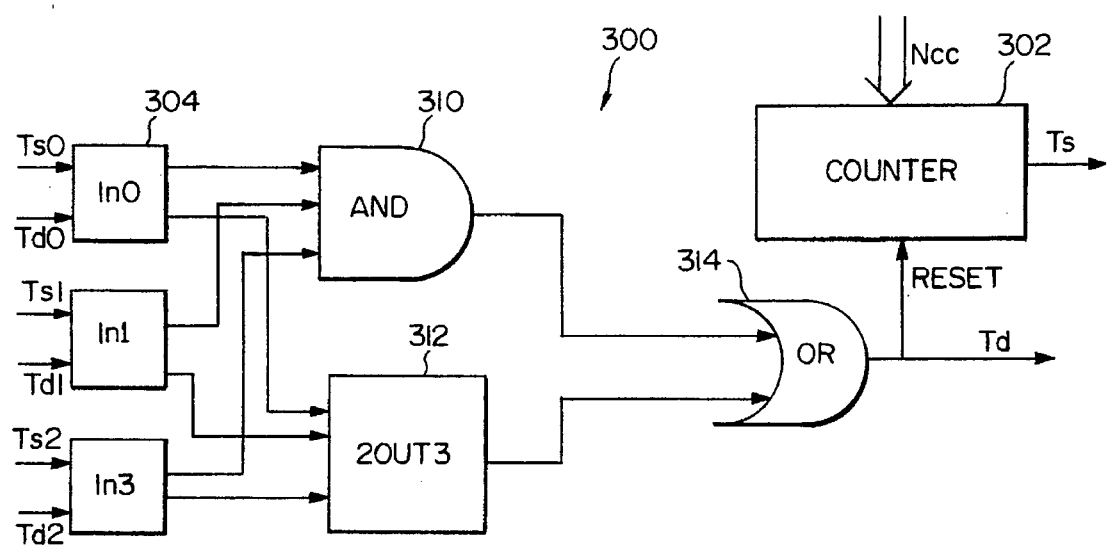
FIG. 30 is a block diagram of the synchronization apparatus included within each group in FIG. 3.

FIG. 30 shows a hardware synchronization module 300 located in each processor group 104. The module 300 includes a counter 302, n input buffers, AND gate 310, logic circuitry 312 and OR gate 314. Each counter 302 has a frequency $c_{fp}$ and has cc clock cycles within each synchronization cycle. In a hypercube of dimension n having a total of $N=2^n$ nodes, each node p is linked to n=3 neighboring nodes. Module 300 embodiments vary with the number of faults system 100 is to tolerate. System 100 can tolerate up to m byzantine-type faults, where m=(n-1)/2.

Starting with counter 302 reset, counter 302 counts to cc, then generates an end of cycle signal $T_s$ which is sent to each neighboring synchronization module 300'. Counter 300 receives $T'_s$ signals from neighboring modules 300' at respective input buffers 304i. These signals $T'_s$ are channeled to AND gate 310. When module 300 has received signals $T'_s$ from all n neighboring modules 300', then AND gate 310 generates an active output which causes an active output at OR gate 314, resulting in set crossbar signal $T_d$. Signal $T_d$ is sent to each of the n neighboring module 300' and after a fixed time period resets counter 302. In addition, the signal $T_d$ causes the crossbar switch 116 to change implementing the permutation routing for the next communication cycle. Module 300 begins the next synchronization cycle after the fixed time. Such fixed time is specified to exceed the skew time among nodes. Thus, the slowest node ends it communication cycle before the fast nodes begin a new communication cycle.

The signals $T'_d$ from neighboring modules 300' are received at input buffers 304i and channeled to logic circuitry 312. Logic circuitry 312 implements m+1 out of n logic. Specifically, whenever m+1 of the n neighboring module $T'_d$ signals are received at module 300, logic circuitry 312 generates an active output. Such output causes an active output at OR gate 314, resulting in signal $T_d$. Counter 302 therefore is reset.

Thus, signal $T_d$ is generated under two alternative conditions:

(1) when all end of cycle signals $T_s$ from the n neighboring nodes are received; or (2) when set crossbar signals $T_d$ from m+1 of the n neighboring nodes are received.

Once a node activates its set crossbar signal $T_d$, it starts a new synchronization cycle after approximately 1.5 microseconds, the approximate skew time among set crossbar signals for each node.

FIG. 30 shows the embodiment for n=3, N=8, where each node p corresponds to a group 104. Thus, 1 byzantine fault can be tolerated. For an n=5 hypercube, 2 byzantine faults can be tolerated. For an n=6 hypercube, m=2.

If the period for each synchronization cycle is 10 milliseconds and the clock frequency $c_{fp}$ is 40 MHz, then the greatest skewing that might occur is approximately 1.35 microseconds. For an n=4 hypercube, m=1. If the period for each synchronization cycle is 10 milliseconds and the clock frequency $c_{fp}$ is 40 MHz, then the greatest skewing that might occur is approximately 0.7 microseconds. Prior synchronization schemes for hypercubes include only software solutions. Of these the best skew performance is approximately 200 microseconds, even with time stamping hardware.

Figure 31:
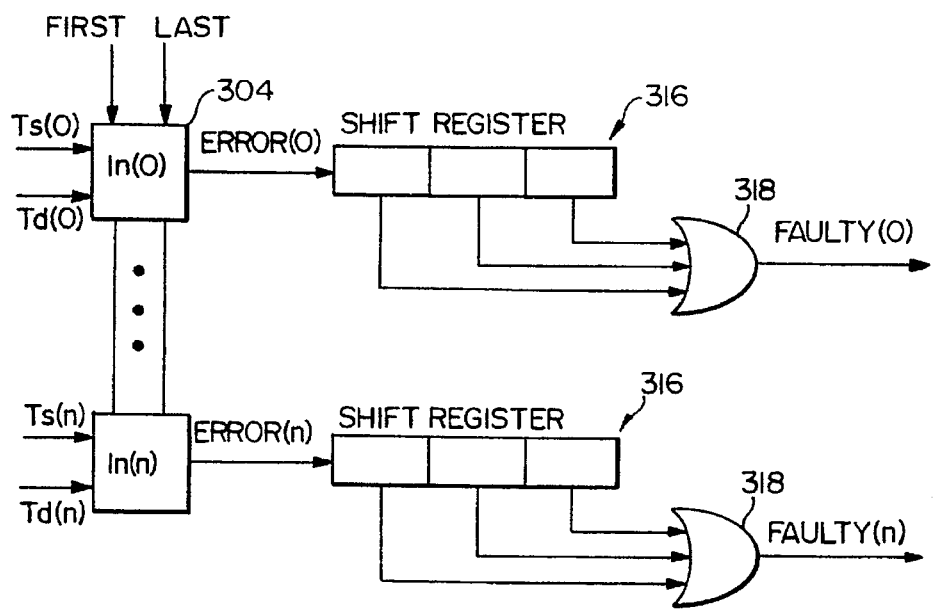
FIG. 31 is a block diagram of the fault detection logic at the inputs of the synchronization apparatus of FIG. 30.

For added fault tolerance, each module 300 continuously monitors its inputs (see FIG. 31). If it receives a signal from a neighbor during 3 consecutive synchronization cycles which is not within an acceptable time window, such neighbor node is marked bad, an error flag is set and the signals from such node are masked out precluding the node from participating in the synchronization process. If a node flagged bad gives correct inputs for three consecutive synchronization cycles then it is marked good and its flag reset. Such node then participates in the synchronization process.

The window commences with the generation of the end of cycle signal $T_s$. If the input occurs within the window then a no error signal is generated by a respective buffer 304 and shifted into a corresponding 3-bit shift register 316. Each bit position is coupled to an OR gate 318. Thus, when three consecutive error signal s occur, the corresponding neighbor node 300' is marked faulty. Similarly, when three consecutive no error signals occur, the node 300' is marked non-faulty. For less than three consecutive error signal states, the status does not change.

Concluding Remarks

Although a preferred embodiment of the invention has been illustrated and described, various alternatives, modifications and equivalents may be used. For example, the permutation process applies for an enhanced hypercube of any dimension n greater than or equal to 3. Also, the number of clusters per group or program processors per cluster may vary, as well as the processor models therein. Although described as an SPMD machine, the system can implement lower granularity as an MIMD machine. Therefore, the foregoing description should not be taken as limiting the scope of the inventions which are defined by the appended claims.

What is claimed is:

1. A method for updating cache memory in a multiprocessor system having shared memory, comprising the steps of:

allocating a first area of shared memory as being for data that is written before being read, and indicating at one of line or page units of shared memory that a given unit is write before read;

implementing a write operation of data through cache memory for a shared memory address within the write before read area by (1) updating a tag for a first line of the cache memory corresponding to said shared memory address without reading from shared memory, (2) writing said data to a corresponding portion of said first line irrespective of whether said data is a byte, word, or double word and irrespective of whether said data is word-aligned in the first line, (3) setting a third status for said first line denoting valid data is present; and (4) setting a second status for said first line denoting that the first line has been write generated; and checking said second status during a later write operation to said first line to determine whether to treat the later write operation as a cache miss.

2. The method of claim 1, in which said first cache memory line comprises the second status, the third status, a tag and a data portion, the data portion for storing data, the tag for linking data stored in the data portion to shared memory, the third status for indicating whether valid data is stored in the data portion; and in which a write operation for first data having an address within the first area and not present in the cache memory comprises:

(a) loading a first tag for the first data into a first cache line without reading corresponding data from shared memory, (b) writing the first data into the data portion of said first cache line irrespective of write alignment, (c) setting the third status to valid, and (d) setting the second status to dirty; and in which a write operation for second data having an address encompassed by said first tag of said first cache line, a corresponding third status set to valid and a corresponding second status set to dirty is treated as a cache miss.

3. The method of claim 1, in which the second status comprises two bits and wherein two writes are allowed to a write generated line in cache.

4. The method of claim 1, in which page units of shared memory are defined as write before read areas; and in which the second status is located in a page table of a translation look-aside buffer, the second status comprising a fourth status bit per line of a write generated page, each fourth status bit for denoting whether a corresponding line in the write generated page has been write generated.

5. A multiprocessor system having a single-board processor cluster, the cluster comprising:

a plurality of program processors;

shared memory accessible by each one of said plurality of program processors via a shared memory bus;

dual port memory coupled to the shared memory bus and having a first port and a second port;

a pair of serial I/O channels accessible by each one of said plurality of program processors via said dual port memory, a first I/O channel of said pair for receiving first data from outside the cluster and a second I/O channel of said pair for outputting second data received from within the cluster;

wherein the first port of dual port memory is coupled to the pair of I/O channels and the second port is coupled to the shared memory bus;

a control processor for (1) scheduling processing tasks among program processors, (2) managing time-shared I/O operations to and from respective program processors across the pair of serial I/O channels, and (3) managing communication between program processors; and external cache memory coupled to the shared memory bus, in which a first area of shared memory is allocated as being for data that is written before being read, the first area allocated in one of line or page units of shared memory, a first status associated with each unit indicating whether unit is write before read;

the external cache memory having a cache write generate mode during which a write generate operation specifying an address in the first area is validated on a cache-write miss without reading data from shared memory, the write generate operation comprising: (1) updating a tag for a first line of the cache memory corresponding to said first area address without reading from shared memory, (2) writing said data to a corresponding portion of said first line irrespective of whether said data is a byte, word, or double word and irrespective of whether said data is word-aligned in the cache memory line, (3) setting a third status for said first line denoting valid data is present; and (4) setting a second status for said first line denoting that the first line includes dirty data; and in which said second status is checked during a later write operation to said first line to determine whether to treat the later write operation as a cache miss.

6. The system of claim 5, in which said first cache memory line comprises the second status, the third status, a tag and a data portion, the data portion for storing data, the tag for linking data stored in the data portion to shared memory, the third status for indicating whether valid data is stored in the data portion; and in which a write operation for first data having an address within the first area and not present in the cache memory comprises:
(a) loading a first tag for the first data into a first cache line without reading corresponding data from shared memory,
(b) writing the first data into the data portion of said first cache line irrespective of write alignment,
(c) setting the third status to valid, and
(d) setting the second status to dirty; and in which a write operation for second data having an address encompassed by said first tag of said first cache line, a corresponding third status set to valid and a corresponding second status set to dirty is treated as a cache miss.

* * * * *